(12) United States Patent
Lally et al.

(10) Patent No.: US 7,042,228 B2
(45) Date of Patent: May 9, 2006

(54) TRANSDUCER IN-SITU TESTING APPARATUS AND METHOD

(75) Inventors: Richard W. Lally, Virginia Beach, VA (US); Donald E. Kennamer, Virginia Beach, VA (US); Isaak Baber, Virginia Beach, VA (US)

(73) Assignee: Oceana Sensor Technologies, Inc., Virginia Beach, VA (US)

( * ) Notice: Subject to any disclaimer, the term of this patent is extended or adjusted under 35 U.S.C. 154(b) by 0 days.

(21) Appl. No.: 10/774,634

(22) Filed: Feb. 9, 2004

(65) Prior Publication Data

US 2004/0194532 A1    Oct. 7, 2004

Related U.S. Application Data

(63) Continuation-in-part of application No. 10/131,673, filed on Apr. 24, 2002, now Pat. No. 6,698,269.

(60) Provisional application No. 60/286,932, filed on Apr. 27, 2001.

(51) Int. Cl.
*G01R 31/08* (2006.01)
*G01R 29/22* (2006.01)
*G01P 21/00* (2006.01)
*H03F 1/14* (2006.01)

(52) U.S. Cl. ............... 324/527; 324/727; 73/1.38; 330/51

(58) Field of Classification Search ............ 324/727, 324/710, 601, 527; 73/1.08, 1.38, 1.15, 1.82; 330/51, 127–142, 2, 174
See application file for complete search history.

(56) References Cited

U.S. PATENT DOCUMENTS 3,786,348 A * 1/1974 Lynas et al. ............ 324/727
3,924,456 A * 12/1975 Vahaviolos ............. 73/770
5,205,151 A * 4/1993 Shimamura et al. ..... 73/1.02

(Continued)

OTHER PUBLICATIONS

Morgan Matroc Inc., "Piezoelectric Technology, Data for Designers", available at morganelectroceramics.com, not dated.

(Continued)

*Primary Examiner*—Anjan Deb
*Assistant Examiner*—Jeff Natalini
(74) *Attorney, Agent, or Firm*—Stephen B. Salai, Esq.; Donna P. Suchy, Esq.; Harter, Secrest & Emery LLP

(57) ABSTRACT

The present invention is directed to an apparatus and method for a measurement system for the testing of transducers, and more particularly to the testing of piezoelectric transducers. The measurement system includes a transducer, a feedback amplifier coupled to the transducer and a signal processing circuit coupled to the output of the amplifier. The method of testing the transducer includes coupling the test signal to the transducer, disabling the amplifier, and measuring the response of the transducer to the test signal with the test processing circuit. The circuit itself used for performing this method includes a piezoelectric transducer, an amplifier, including a feed-back circuit coupled to the amplifier for amplifying the output of the transducer, a power source coupled to the amplifier, a signal source generating a test signal having a frequency spectrum at least overlapping the self resonant frequency of the transducer coupled to the transducer, and a switch coupled to the amplifier capable of disabling the amplifier.

21 Claims, 24 Drawing Sheets

U.S. PATENT DOCUMENTS

| | | |
|---|---|---|
| 5,251,469 A | 10/1993 | Chan |
| 5,447,051 A * | 9/1995 | Hanks et al. ................ 73/1.15 |
| 5,457,982 A | 10/1995 | Spies et al. |
| 5,570,300 A | 10/1996 | Henry et al. |
| 5,734,596 A * | 3/1998 | Medelius et al. ........... 702/107 |
| 5,753,793 A | 5/1998 | Lindahl et al. |
| 5,774,378 A | 6/1998 | Yang |
| 5,832,412 A | 11/1998 | Guez |

OTHER PUBLICATIONS

Hermann K.P. Neubert, "Instrument Transducers", Claredon Press, Oxford 1975.

Jungho Ryu et al., "Magnetoelectric Properties in Piezoelectric and Magnetostrictive Laminate Composites", Jpn. J. Appl. Phys. vol. 40 pp. 4948-4951 (2001).

* cited by examiner

The block diagram of the sensor self-test system.

Generic amplifier self-test configuration.

Three wire voltage mode self-test circuit.

Three wire charge amplifier.

The two-wire charge mode preamplifier with self-test feature.

.5 volt excitation 5 volt excitation

Sensor Self-Test Procedure

TRANSDUCER IN-SITU TESTING APPARATUS AND METHOD

CROSS-REFERENCE TO RELATED APPLICATIONS

This application is a continuation-in-part of application Ser. No. 10/131,673, filed Apr. 24, 2002 now U.S. Pat. No. 6,698,269 entitled TRANSDUCER IN-SITU TESTING APPARATUS AND METHOD, and Ser. No. 10/131,673 claims the benefit of U.S. Provisional Application No. 60/286,932, filed Apr. 27, 2001 entitled METHOD AND APPARATUS FOR AUTOMATED IN-SITU TESTING OF SENSORS INCLUDING PIEZOELECTRIC ACCELEROMETERS.

FIELD OF INVENTION

This invention relates to an apparatus and method for in-situ testing of transducers, and more particularly to the testing of piezoelectric transducers including piezoelectric accelerometers.

BACKGROUND

Transducers are widely used in measurement systems. The term transducer refers either to a sensor or an actuator. "Sensor" normally refers to a device that detects a change in a physical property due to a physical stimulus and turns that stimulus into a signal, which can be measured or recorded. "Actuator" refers to a device that accepts an input stimulus and converts it into a different kind of output stimulus. Then, the term "transducer" normally refers to a device that transfers energy of one kind to another in the same or a different form and includes either a "sensor" or an "actuator". Thus the sensor is considered to be the sensing element itself and the transducer is considered to be the sensing element plus any associated circuitry for transmitting the measured physical change to a remote location. Transducers can be used to test the state of a mechanical or physical system or some portion of that system.

Through the use of transducers the properties of a system can be measured by observing the change in the properties of another system. For example, the absorption of ultraviolet light in some chemical compounds can be measured by directing a specific incident spectrum of light onto a compound and measuring the intensity of reflected light as a function of wavelength. The sensor provides the measurement and the transducer converts it to an electrical signal that is representative of the measurement. From the signal a computer analyzes which wavelengths are absorbed and which are reflected while also taking into account any other factors.

There are a number of types of transducers. Generally transducers are classified according to the physical effect that they use or according to the property that they measure. For instance, the effect that they use might be piezoelectric or photovoltaic effect and the property that they measure might be a measurement of length or temperature. Although transducers are often used in mechanical and physical systems, the amount of confidence in the result of a measurement taken through a sensor is greatly increased when all the factors influencing that measurement are monitored.

There is a class of transducers that are called self-generating transducers, which include thermocouples, piezoelectric, and photovoltaic transducers among others. These transducers do not require a power supply because they generated a signal internally. A thermocouple, for example, produces a change in voltage in response to a temperature difference and a piezoelectric material generates a charge that can be measured when it is stressed. There are a number of piezoelectric devices including accelerometers.

Piezoelectric devices generally are particular types of crystals that develop a charge when stressed in a specific direction. The charge that develops in a piezoelectric transducer is proportional to both the piezoelectric constants of the material and the applied stress on the piezoelectric device. This piezoelectric constant depends on the mode of operation employed including bend, shear and compression. Quartz crystals are used as piezoelectric devices in some systems, but manufactured ceramics, such as Lead-zirconate-titanate (PZT) ceramics, are also widely used in piezoelectric transducers because they have a higher piezoelectric constant and therefore a higher charge output. Many piezoelectric transducers have built-in charge amplifiers. This greatly reduces problems with interference and low signal levels.

Generally, piezoelectric accelerometers and other transducers that are being used as sensors are meant to operate for long periods of time with minimal maintenance. It is important that if there is a failure or degradation of the piezoelectric material or transducer that the operator know this as soon as possible. For instance, if there is a failure of the bond between the structure being monitored and the piezoelectric accelerometer, it would be important for an operator to know this as soon as possible since any data collected subsequent to the failure would be unreliable. If there is any internal mechanical failure of the piezoelectric accelerometer, the device is useless and needs to be replaced immediately.

In the past, failure or degradation and other related properties have been difficult to ascertain without specific testing equipment and without taking apart the machine on which the transducer was installed. With the advent of microcircuitry and embedded sensors, this is extremely expensive and difficult to accomplish without destroying the transducer and possibly other parts of the monitoring device as well as the body being monitored. Thus any sensor data must be accurate and reliable if it is to form the basis of the very important and costly condition-based maintenance decisions.

Accordingly, there is a need for improvement in the art to enable transducers to be tested in-situ and specifically, there is a need for an apparatus and method to allow in-situ testing of transducers such as piezoelectric transducers and accelerometers that convert mechanical strain to an electric signal. There is a particular need for a self-testing transducer circuit. It is to such improvements that the present invention is directed.

SUMMARY OF INVENTION

The present invention is directed to an apparatus and method for a measurement system for the testing of transducers, and more particularly to the testing of piezoelectric transducers. The measurement system includes a transducer, a feedback amplifier coupled to the transducer and a signal processing circuit coupled to the output of the amplifier. The method of testing the transducer includes coupling the test signal to the transducer, disabling the amplifier, and measuring the response of the transducer to the test signal with the test processing circuit. The circuit itself used for performing this method includes a piezoelectric transducer, an amplifier, including a feed-back circuit coupled to the amplifier for amplifying the output of the transducer, a power source coupled to the amplifier, a signal source generating a test signal having a frequency spectrum at least overlapping the self resonant frequency of the transducer coupled to the transducer, and a switch coupled to the amplifier capable of disabling the amplifier.

BRIEF DESCRIPTION OF THE DRAWINGS

In the detailed description of the preferred embodiment of the invention presented below, reference is made to the accompanying drawings.

DETAILED DESCRIPTION OF THE INVENTION

Figure 1:
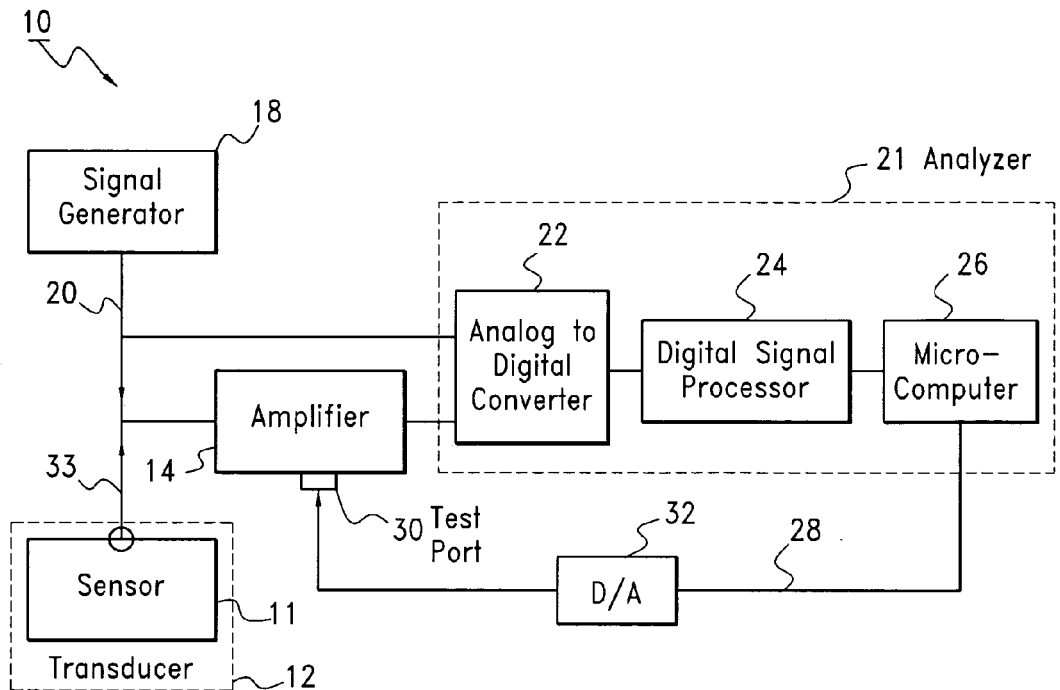
FIG. 1 is a block diagram of the transducer self-test system.

This invention provides a method and an apparatus for the in situ measurement of the electrical output impedance of any transducer allowing the transducer to have an internal self-testing circuit capable of implementing self-testing. In many cases the self-testing apparatus can be simply retrofitted to an existing transducer circuit. A block diagram of the self-test measurement system is shown in FIG. 1. The self-testing measurement system, also known as a self-testing circuit 10 and method can be conveniently implemented with an "intelligent" sensor shown in FIG. 1. The self-testing circuit 10 includes a sensor 11 with a circuit, called a transducer 12, an amplifier 14 sometimes called a preamplifier 14, a signal generator 18 that can generate a test signal 20 traveling in the direction of the arrow. The self-testing circuit 10 also has an analyzer 21 that can include an analog to digital converter 22, a digital signal processor 24 and a microcomputer 26. The microcomputer communicates to the pre-amplifier through a feedback loop 28 via a test port 30 containing a digital to analog converter 32.

In order to retrofit an existing transducer circuit the signal generator 18 and a coupling device, such as a capacitor, must be particularly placed and attached to the existing transducer circuit, as will be discussed in detail below. It is important to note that the arrangement and positioning of the transducer 12, the amplifier 14, the signal generator 18, reference, and analyzer 21 are important to this invention as will be discussed in detail. A significant advantage of this invention is that one skilled in the art can retrofit a transducer circuit with the circuits described in this invention. The very important information that these measurements will ascertain is described below. These measurements can then be taken by adding the additional analytic software and switching to "measurement mode". The measuring and analyzing of the various useful parameters will be discussed below in detail.

The transducer 12 of this invention can include one or more of a piezoelectric, capacitive or inductive devices, and can be from a class of transducers that are called self-generating transducers which include thermal couples, piezoelectric, and photovoltaic transducers among others. The present invention is well suited for application with a piezoelectric accelerometer that can measure mass compression or displacement and generate a measurable charge. The self-generating transducers do not require an external power supply because they generate a signal internally. Piezoelectric transducers have one or more characteristic resonant frequencies. The piezoelectric accelerometers can be crystals such as quartz crystals or ceramics such as Lead-Zirconate-Titanate (PZT). It is possible to send signals near the resonant frequencies to the transducer and measure the output in that frequency band without interfering with the operation of the transducer.

As shown in FIG. 1, the self-testing transducer circuit 10 includes the transducer 12, which is characterized by a self-resonant frequency, the amplifier 14 connected to the transducer that amplifies a transducer output signal 33, the signal generator 18 that generates the test signal 20 that has a spectrum at least overlapping the self-resonant frequency of the transducer also connected to the amplifier, and the analyzer 21 including the microcomputer 26. The analyzer 21 is connected to the output of the amplifier 16 for measuring the response of the transducer to the test signal 20 and to characterize at least one parameter of the transducer 12 such as mechanical quality factor Q, the resonant frequency, the total impedance, $Z_t$, and the mechanical impedance, $Z_m$.

The test signal 20 from the signal generator 18 is injected at a sensor node located at the junction of the sensor 11 and amplifier 14. The amplifier output is then digitized by the analog to digital converter 22 whose output is sent to a digital signal processor 24 that may compute the spectrum of the digitized signal or perform other signal processing. A microcomputer 26 is used to analyze the spectrum or other output of the digital signal processor. The signal generator 18 may produce a number of waveforms such as wide-band noise, sinusoidal oscillation, or a swept frequency narrow band signal. The signal generator output may be input to the analog to digital converter 22 so that correlation between self-test output signal and signal generator excitation may be computed. This may allow for the rejection of any other sensor signals that may be present by performing synchronous averaging or cross-correlation. The signal generator 18, analog to digital converter 22, digital signal processor 24, and microcomputer 26 may also comprise a digital spectrum analyzer or similar spectrum analysis tool.

Described in this application is a simple model of a piezoelectric accelerometer including the total output impedance of the imbedded sensor 11. Then, three specific embodiments of the self-test circuit 10 that can provide a measure of the transducer output impedance are discussed along with examples of the self-test circuit output signals for various sensor conditions and failure modes. The self-test circuits described below give output signals that reflect the total electromechanical output impedance of the installed sensor. The total output impedance contains information on the electrical properties of the sensor, the electromechanical coupling strength as well as the sensor mechanical input impedance and the mechanical impedance of the sensor input port termination. The power spectrum of a self-test circuit output is analyzed to provide the various measures of sensor health and function and the predicted output signals of the charge mode and voltage mode test circuits are computed as a function of the electrical and mechanical parameters of the transducer and amplifier. The quantitative inference of transducer and preamplifier parameters from the measured test circuit's output spectra and the interpretation of the data in terms of various failure modes are discussed below.

Figure 2:
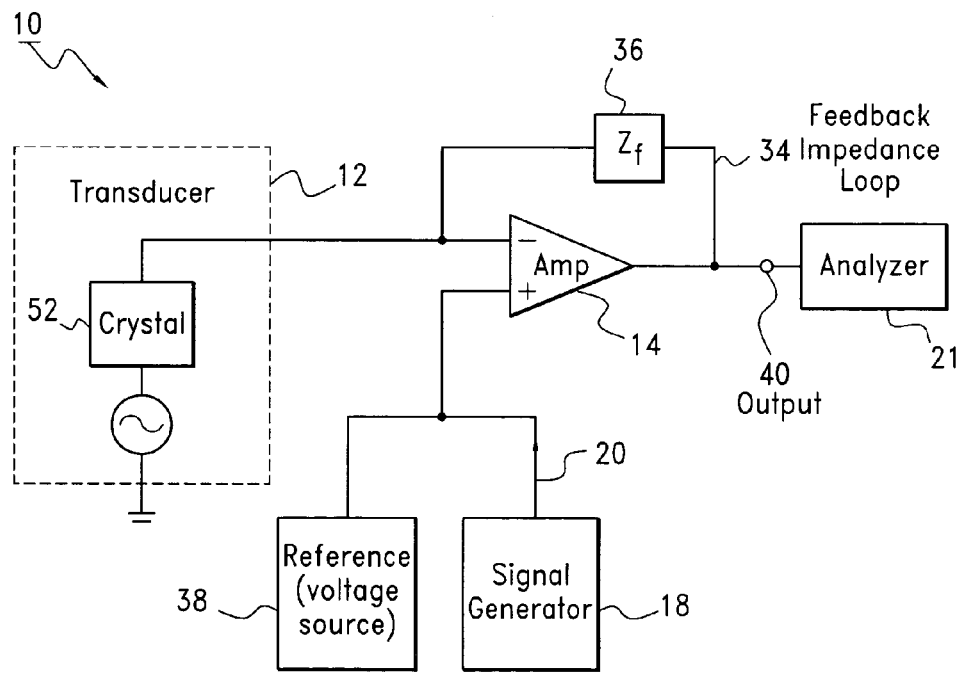
FIG. 2 is a schematic diagram of a generic self-test system.

As shown in FIG. 2 the self-testing transducer circuit 10 includes the transducer 12, which is characterized by a self-resonant frequency. The amplifier, often called a preamplifier 14 is connected to the transducer and the self-testing transducer circuit 10 includes a feedback impedance loop 34 with impedance ($Z_f$) 36. The self-testing transducer circuit 10 shown also includes the signal generator 18 to generate the test signal 20 connected to the preamplifier 14 along with a reference 38, shown here as a reference voltage source 38. The preamplifier output 40 is connected to various analyzers, such as analyzer 21 shown in FIG. 1. The analyzer measures the response of the transducer to the test signal and thus characterizes at least one parameter of the transducer.

Figure 3:
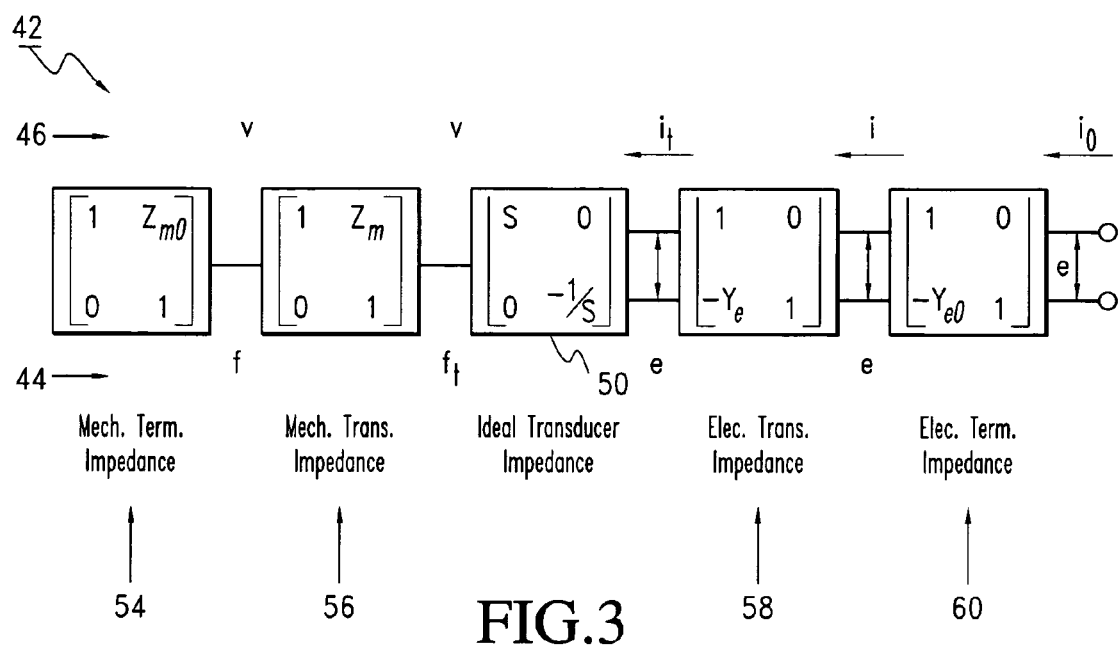
FIG. 3 is a schematic diagram of the generic transducer self-test system represented by a series of matrices.

Shown in FIG. 3, is a simple two-port model 42 of a piezoelectric transducer that was developed following the analysis presented by Neubert in order to design the self-testing transducer circuit 10 and related methods of use. In the two port representation we are using, the input variables 44 of the ideal transducer are force $f_t$, and velocity, v while the output variables 46 are voltage, e, and current, i. The ideal piezoelectric transducer two-port representation is the 2×2 matrix 50 contained in the central block of FIG. 3 where S (Coulomb/meter) is a measure of the charge developed by a crystal 52 (shown in FIG. 2), $Q_t$, as a function of the crystal strain, x, as represented by the Equation (1):

$$Q_t = -Sx \qquad (1)$$

The complete model of the piezoelectric transducer as shown in FIG. 3 has the central block 50 representing the ideal transducer. The blocks to the left represent the transducer mechanical impedance 54 and the mechanical termination impedance 56 of the transducer. To the right of the ideal transducer block are the electrical transducer impedance block 58 and the electrical termination impedance 60. The solution of these matrices form the basis of the quantitative analysis of the transducer's output.

Figure 4:
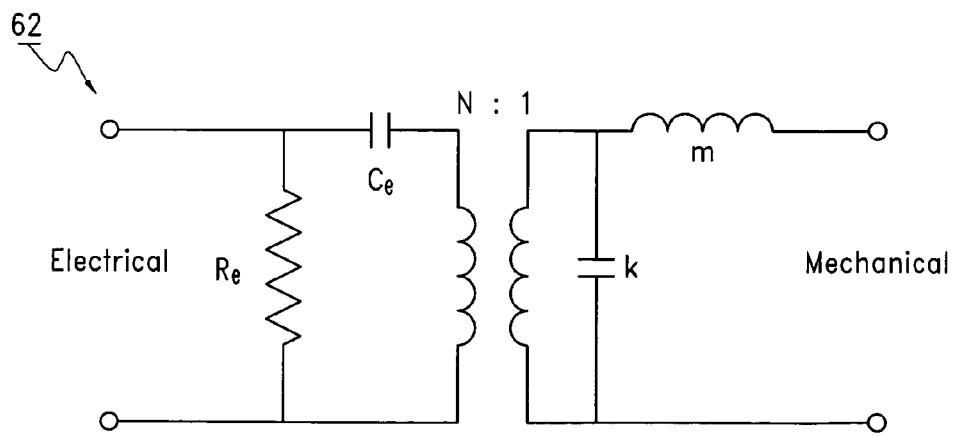
FIG. 4 is a schematic diagram of the generic transducer self-test system represented by electrical components.

FIG. 4 shows an electrical schematic of an ideal transducer 62 representing the crystal 52. The electrical schematic of the ideal electrical transformer 62 is designed with a turns ratio of N:1 where N=S (a measure of the charge developed). In this way the entire transducer, including the mechanical elements, may be represented as an equivalent electrical network. Although the analysis presented here will not employ this equivalent circuit representation the model is included as an alternative way to analyze the transducer output. The electrical equivalent circuit of the piezoelectric transducer, including the mechanical impedance and electrical transducer impedance, is shown. The ideal transducer is represented by a N:1 turns ratio transformer, the transducer electrical impedance is represented by the capacitance of the piezoelectric crystal $C_e$, and the leakage resistance of the sensor, $R_e$; the mechanical impedance of the transducer is represented by an inductor with a value equal to the transducer test mass, m, and compliance, k. Note that this representation is the equivalent of the central three blocks of FIG. 3.

Of interest in the present application is the apparent admittance (or equivalently the impedance) at the output of the sensor. This may be calculated in the following manner. First, we multiply the three central matrices displayed in $$\begin{pmatrix} f \\ v \end{pmatrix} = \begin{pmatrix} 1 & Z_m \\ 0 & 1 \end{pmatrix} \begin{pmatrix} S & 0 \\ 0 & -\frac{1}{S} \end{pmatrix} \begin{pmatrix} 1 & 0 \\ -Y_e & 1 \end{pmatrix} \begin{pmatrix} e \\ i \end{pmatrix} = \begin{pmatrix} S + \frac{Z_m Y_e}{S} & -\frac{Z_m}{S} \\ \frac{Y_e}{S} & -\frac{1}{S} \end{pmatrix} \begin{pmatrix} e \\ i \end{pmatrix} \qquad (2)$$

FIG. 3 to find the system of equations that relate the input force and velocity (f/v) to the output voltage and current (e,i) as shown above in Equation (2).

Next we assume that the input force is zero, i.e., no external signals are applied to the accelerometer. Solving the first of the two equations represented in Equation. (2) for i/e, the total output admittance of the sensor, $Y_{e\ total}$, is found.

Alternatively the sensor may be represented by an impedance, $Z_{e\ total} = 1/Y_{e\ total}$. The accelerometer signal is represented as a voltage source, $v_s$, in series with the sensor impedance or in the Norton equivalent circuit, by the sensor admittance in parallel with a current source. When the accelerometer is mounted on a mechanical structure, there is mounting-point impedance, $Z_{m0}$ that corresponds to the mechanical termination impedance 54 shown in FIG. 3. To include the mechanical impedance of the structure the mounting point impedance is added to the transducer impedance, $Z_m + Z_{m0}$. To solve these equations it is assumed that the accelerometer is mounted on an infinitely massive, non-compliant surface. Note that the value of S, the sensor coupling strength in the model, is derivable from the accelerometer parameters shown in Table 1 below.

The first two embodiments of the self-test apparatus and method of this invention are based on a generic operational amplifier as shown by (14) in FIG. 2. The third embodiment uses a "two-wire" charge preamplifier widely used with piezoelectric accelerometers. These self-test apparatus and procedures are for a transducer self-test circuit 10 to determine if a major failure, performance degradation or change in calibration of the sensor has occurred. The present invention also has the ability to track the calibration of an initially calibrated sensor may be sufficient to insure sensor data integrity by tracking changes in calibration from an initial primary calibration.

The self-test circuits described below fall into two categories, the so-called "three wire" preamplifiers in which three separate wires are used for signal, power and a common ground. The other configuration is the "two-wire" preamplifier in which the signal and power share one wire and the ground is assigned to a second wire. We will begin with a discussion of the three-wire circuits. There are two configurations of the "three wire" self-test circuit, the voltage-mode amplifier and the charge-mode amplifier.

Figure 5:
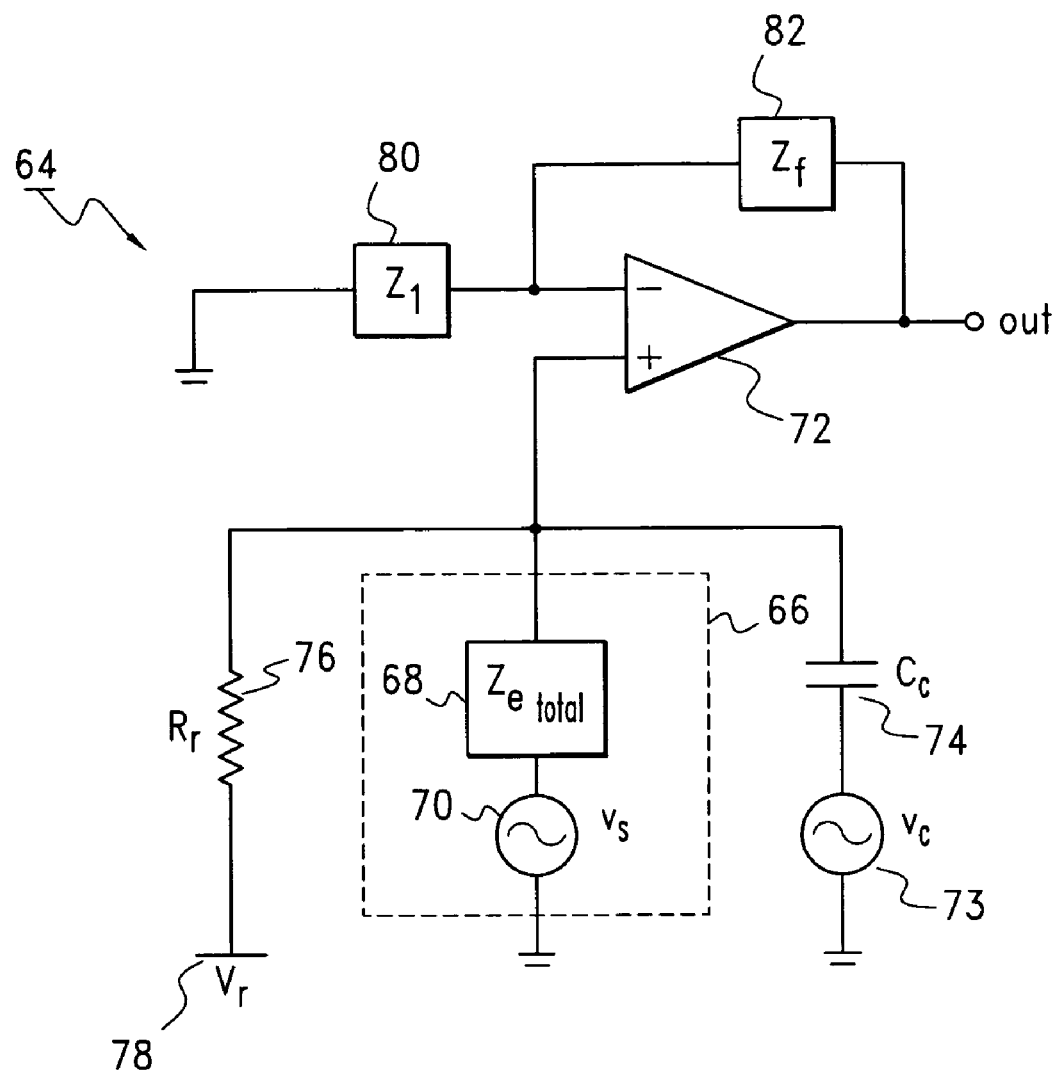
FIG. 5 is a schematic diagram of a three-wire voltage mode transducer self-test system.

A voltage mode self-test circuit 64 is shown in FIG. 5. A transducer 66 is represented by an electrical impedance 68 and signal generator 70 that is connected to the non-inverting input of an operational amplifier 72.

$$v_{out} = \left(\frac{Z_1 + Z_f}{Z_1}\right)\left(\frac{1}{1 + (Z_{e\,total}/R_r)(1 + j\omega R_r C_c)}\right) \quad (4)$$

$$\left(j\omega C_c Z_{e\,total} v_c + \frac{Z_t}{R_r} V_r + v_s\right)$$

Figure 6:
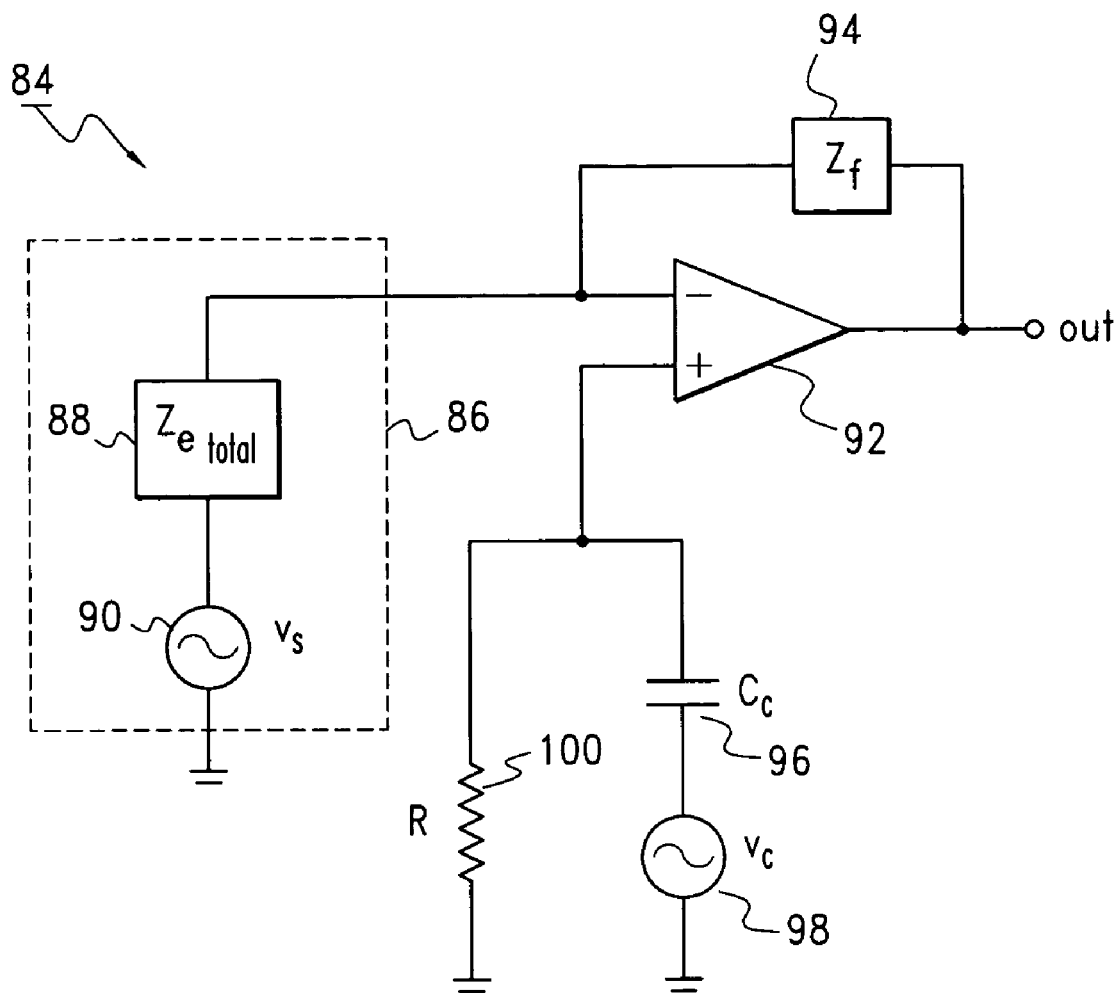
FIG. 6 is a schematic diagram of a three-wire charge amplifier transducer self-test system.

The three-wire charge mode preamplifier self-test configuration is shown in FIG. 6. In this configuration the sensor is placed at the inverting terminal of the ideal operational amplifier and the feedback impedance is $Z_f$. The self-test signal, $v_c$, is applied at the non-inverting input through the capacitor $C_c$. A resistor R is also placed at the non-inverting terminal to provide a dc reference. Note that the signal gain is the usual inverting amplifier expression. The output voltage is found.

A self-test circuit 84 is shown in FIG. 6 for the charge-mode amplifier. The parameters are the same as defined above. The self-test circuit 84 includes a transducer 86, represented by an electrical impedance 88 and a signal source 90 which is attached to an inverting input of an operational amplifier 92. A feedback impedance 94 is in communication with the transducer 86. The non-inverting input of the operational amplifier 92 is connected through a coupling capacitor 96 and to a signal generator 98. The non-inverting input of the operational amplifier is provided a dc reference level by a ground connection through a high value resistor 100. The output signal is a function of the electromechanical parameters of the sensor and preamplifier. Retrofitting a conventional sensor of the "charge-mode amplifier" type to the self-test capable sensor circuit 84 requires adding the self-test signal source 98, the coupling capacitor 96, and adapting the software to run a testing sequence.

Figure 7:
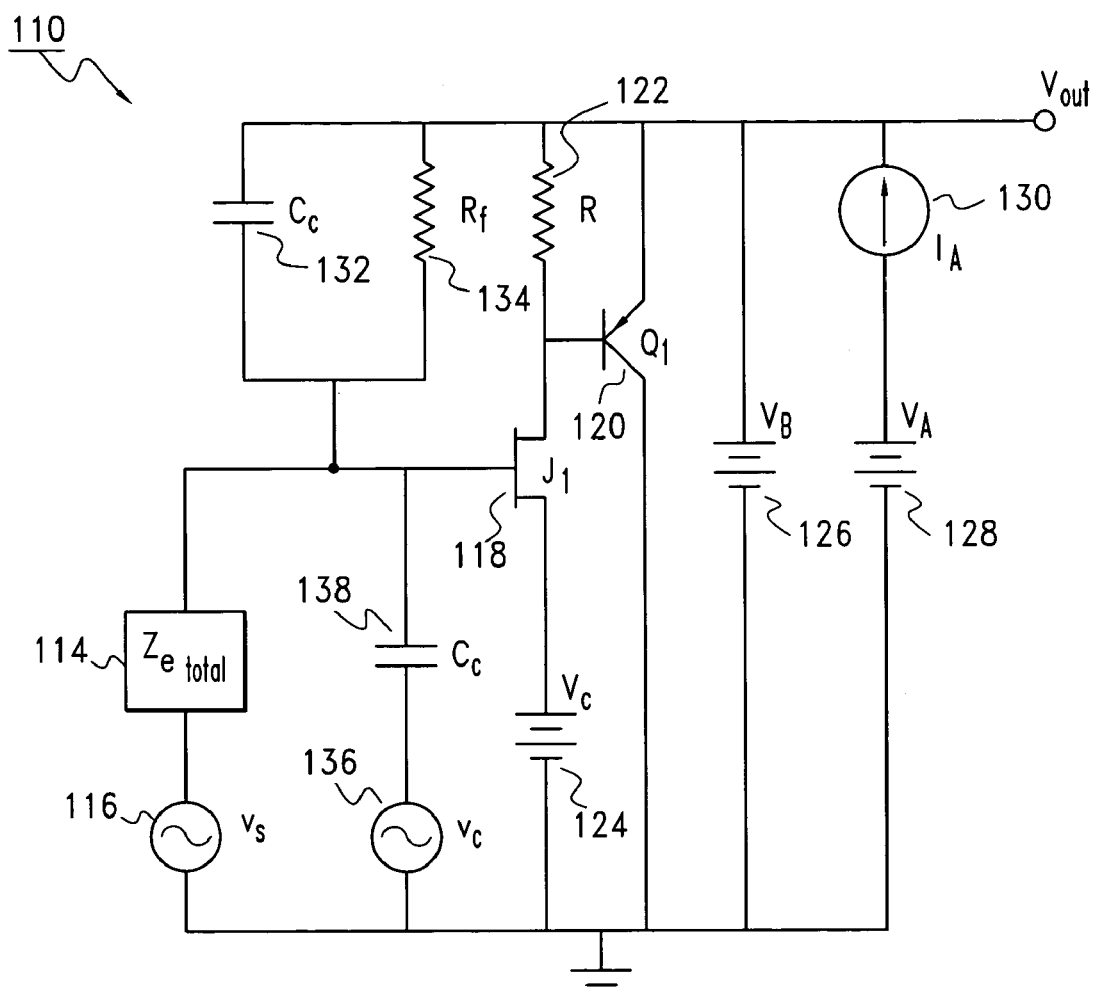
FIG. 7 is a schematic diagram of a two-wire charge mode preamplifier with transducer self-test system.

A "two wire" charge preamplifier implementation of the self-test circuit 110 is shown in FIG. 7. This circuit 110 is meant to represent a generic two-wire charge preamplifier that could have such variations as recognized by those skilled in the art. The transducer is represented by an electromechanical impedance 114, $Z_{e\,total}$, and a signal source 116, $v_s$ and it is attached to the input of the amplifier, which is the gate of a junction field effect transistor, JFET, 118. The two-wire amplifier is composed of a bipolar transistor 120 QI, JFET drain resistor 122, R, and bias voltage sources, $V_A$ 124, $V_B$ 126, and $V_c$ 128. A constant current source 130, $I_A$, is also employed. A feedback capacitor 132, $C_f$, and resistor 134, $R_f$ complete the two-wire charge-mode amplifier. Variations and refinements in the design of the two-wire charge-mode amplifier will be apparent to those skilled in the art.

The self-test feature is implemented by a voltage source 136, $v_c$, coupled to the input of the charge preamplifier through a capacitor 138, $C_c$. Retrofitting a conventional sensor of the "two wire" charge preamplifier" type to the self-test capable sensor circuit 110 requires adding the self-test signal source 136, the coupling capacitor 138, and adapting the software to run a testing sequence. The two-wire self-test circuit was analyzed using the pspice circuit simulation described below. Included are sample computed output spectra for representative sensor and test circuit parameters. The sample computations are summarized below.

In practice the self-test voltage source will be either broadband pseudo-random white noise or a swept sine wave. Assuming that $v_c$ is broad band white noise the output spectra for the three-wire self-test configurations may be computed from Equations 4 and 5 above. Listed below are parameters representative of the OST charge mode accelerometers will be used in the sample computations. The relevant sensor parameters are given in Table 1. The electromechanical coupling constant S (C/m), coulomb per meter, may be computed from the accelerometer sensitivity (pC/g) by multiplying the sensitivity by $[10^{-12}(2Bf_0)^2/9.8]$.

TABLE 1

Parameters of OST charge-mode accelerometers

| | OST Model Number | | |
|---|---|---|---|
| | A5006 | A5013 | A8120 |
| Sensitivity pc/g) | 5 | 12 | 120 |
| Mounted frequency $f_0$ (kHz) | 35 | 30 | 20 |
| Proof Mass ($m_P$) (gm) | 0.7 | 1.6 | 17 |
| "S" (C/m) | 0.025 | 0.044 | 0.19 |
| Capacitance (pF) | 400 | 400 | 3600 |
| Total Mass ($m_T$) (gm) | 2.2 | 3.0 | 25 |

The accelerometer is represented mechanically by a simple harmonic oscillator with mass m, resonant frequency $f_0$ and mechanical quality factor Q. The mechanical impedance, $Z_m$ is the ratio of the force to the velocity of the oscillator, which in the frequency domain is given by equation (6) below:

$$Z_m(\omega) = \frac{m}{j\omega}\left(\omega_0^2 - \omega^2 + \frac{j\omega\omega_0}{Q}\right), \quad (6)$$

where $\omega_0 = 2\pi f_0$.

Figure 8:
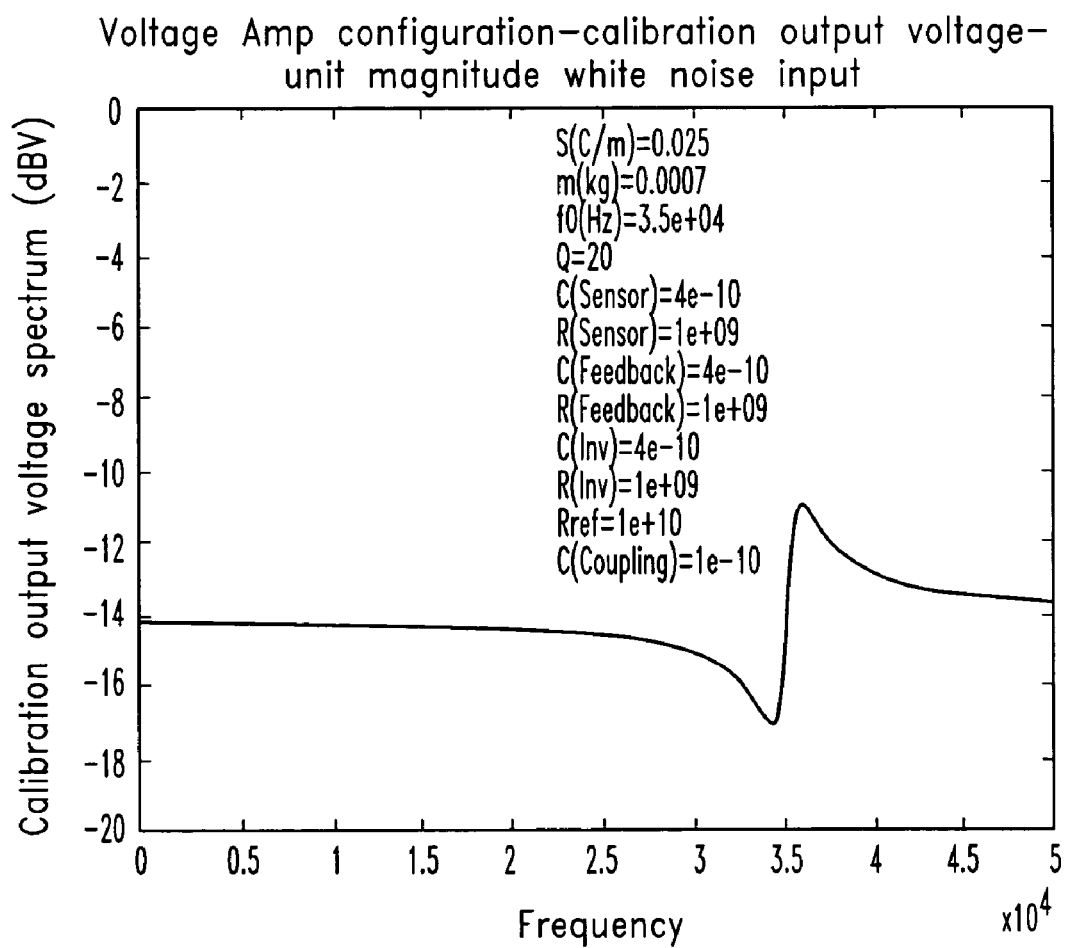
FIG. 8 is a graph of the representative output spectrum for the voltage-mode self-test circuit.

In the first example shown, FIG. 8, the computed three-wire voltage mode self-test output from the self-test circuit 64 is shown for the A5006 model accelerometer. The self-test circuit parameter values are displayed on the graph 140. The feedback capacitance and the capacitance at the inverting amplifier input are chosen to have the same value as the accelerometer, which gives a signal gain of 2 according to Equation 4. FIG. 8 shows the representative output spectrum for the voltage-mode self-test circuit 64.

Figure 9:
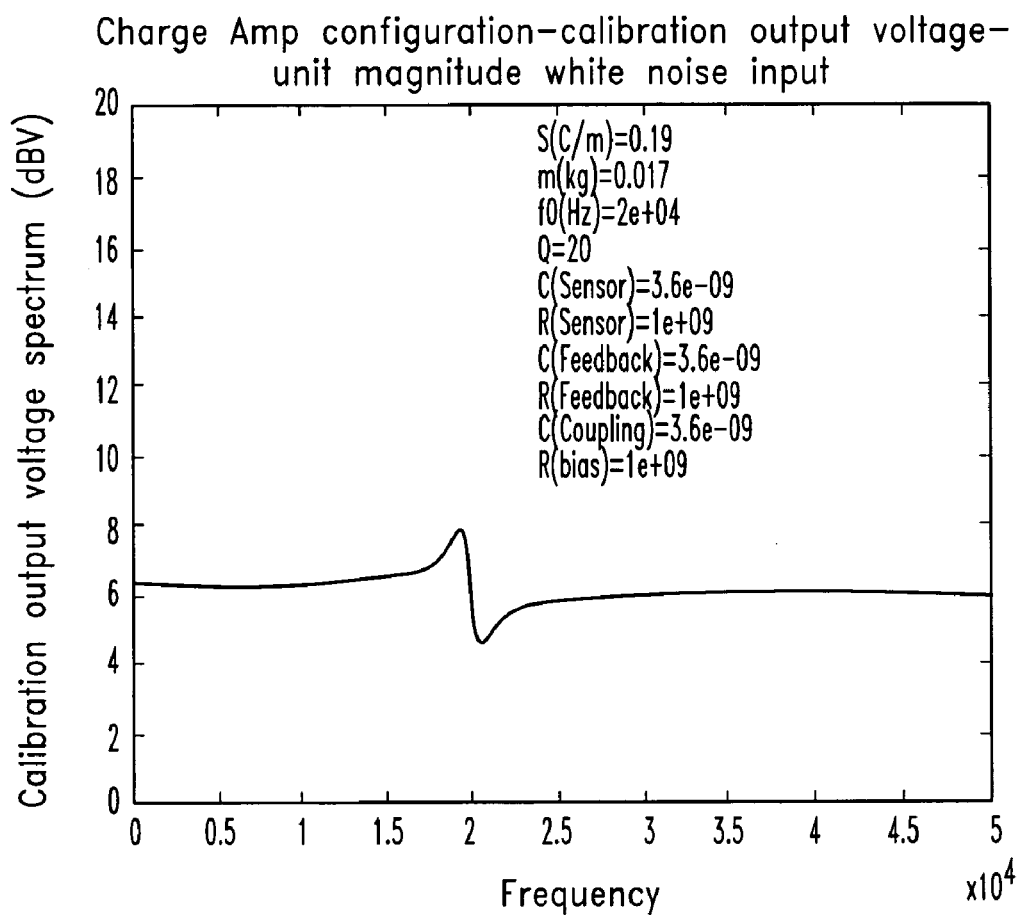
FIG. 9 is a graph of the representative output spectrum for the three-wire charge-mode self-test circuit.

FIG. 9 shows a graph 142 with a representative output spectrum for the three-wire charge mode self-test circuit 84 with similar parameters to those in FIG. 8. Two features obvious in the output spectra are the resonant frequency of the accelerometer, $f_0$, and the frequencies of the resonance and anti-resonance peaks near the accelerometer resonant frequency, see FIG. 10 for their identifications. Information concerning the accelerometer mechanical integrity, mounting conditions, damping, and electromechanical coupling strength may be extracted from a measurement of these parameters.

Figure 10:
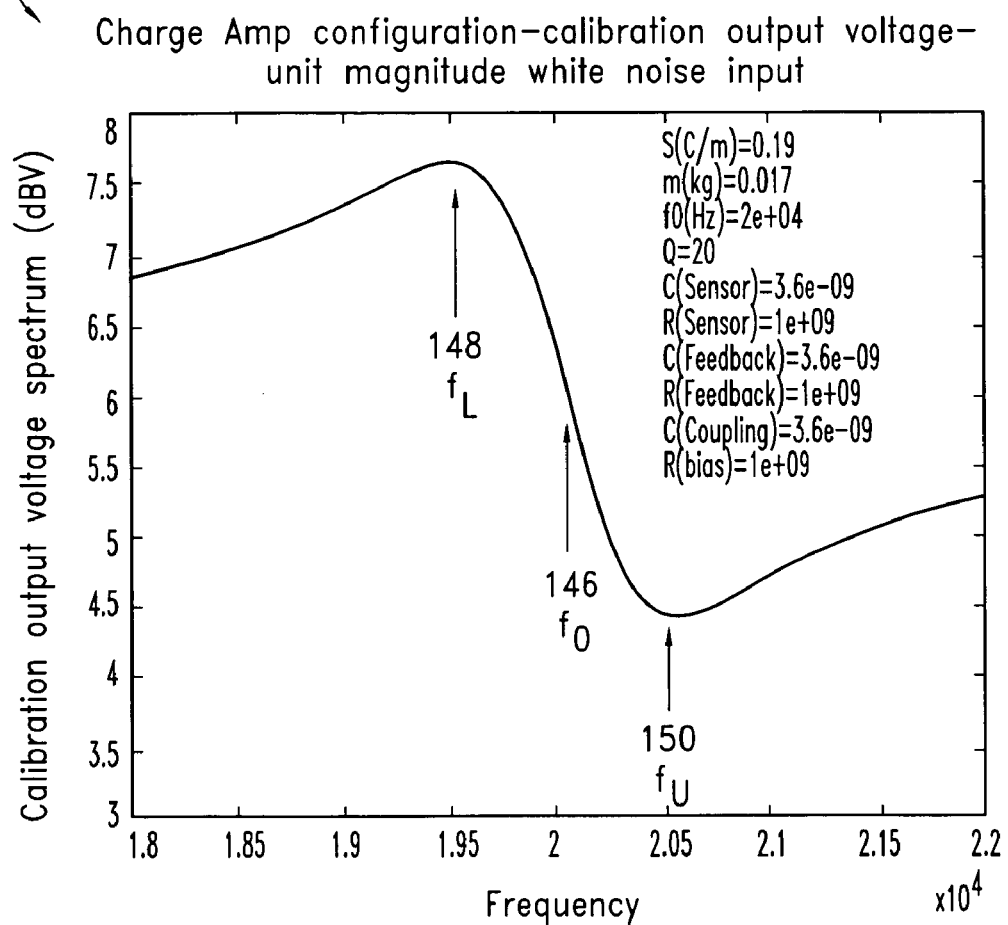
FIG. 10 is a representative output graph near the resonant frequency, $f_o$, showing the resonance and antiresonance.

FIG. 10 shows a graph 144 self-test circuit output near the resonant frequency 146, $f_0$, showing the resonance and anti-resonance at 148 $f_L$, and 150 $f_U$ respectively. For example the accelerometer resonant frequency, $f_0$, is determined by the spring constant of the piezoelectric crystal and the effective proof mass. If the accelerometer is rigidly attached to an "infinitely massive" reaction mass then the effective accelerometer proof mass is equal to the actual accelerometer proof mass. If the accelerometer base were to become detached from the reaction mass, the effective proof mass would decrease, thereby increasing the resonant frequency. The effective accelerometer proof mass, or reduced mass, is $m_{eff} = m_p(m_T - m_p)/m_T$. When the accelerometer is rigidly mounted to an "infinite" reaction mass the effective mass is equal to the proof mass, $m_p$. When the accelerometer is unmounted the reaction mass is $(m_T - m_p)$. Using the numbers from Table 1, we calculate that the resonant frequency shifts may be as large as 22% (A5006), 46% (A5013), and 76% (A8120) when the accelerometer base becomes detached from the reaction mass.

The detailed frequency dependence of the output spectrum near $f_0$ is determined by the accelerometer's mechanical quality factor and the electromechanical coupling strength S. When the Q is high enough, "high enough" is determined by simulation, the normalized frequency difference between the resonant and anti-resonant peaks $(f_u - f_L)/f_0$ yields information about the electromechanical coupling strength S, i.e., the frequency splitting increases as the coupling strength increases.

The detailed functional dependence of $(f_u - f_L)/f_0$ on S is determined by the accelerometer design. When the resonance width (1/Q) is comparable to the splitting, $(f_u - f_L)/f_0$, the output spectrum dependence on Q and S may be somewhat more complicated. However, if an initial test circuit output spectrum were measured, changes in S as the piezoelectric crystal gradually depolarizes over time could be detected by measuring the spectrum near $f_0$.

Figure 11:
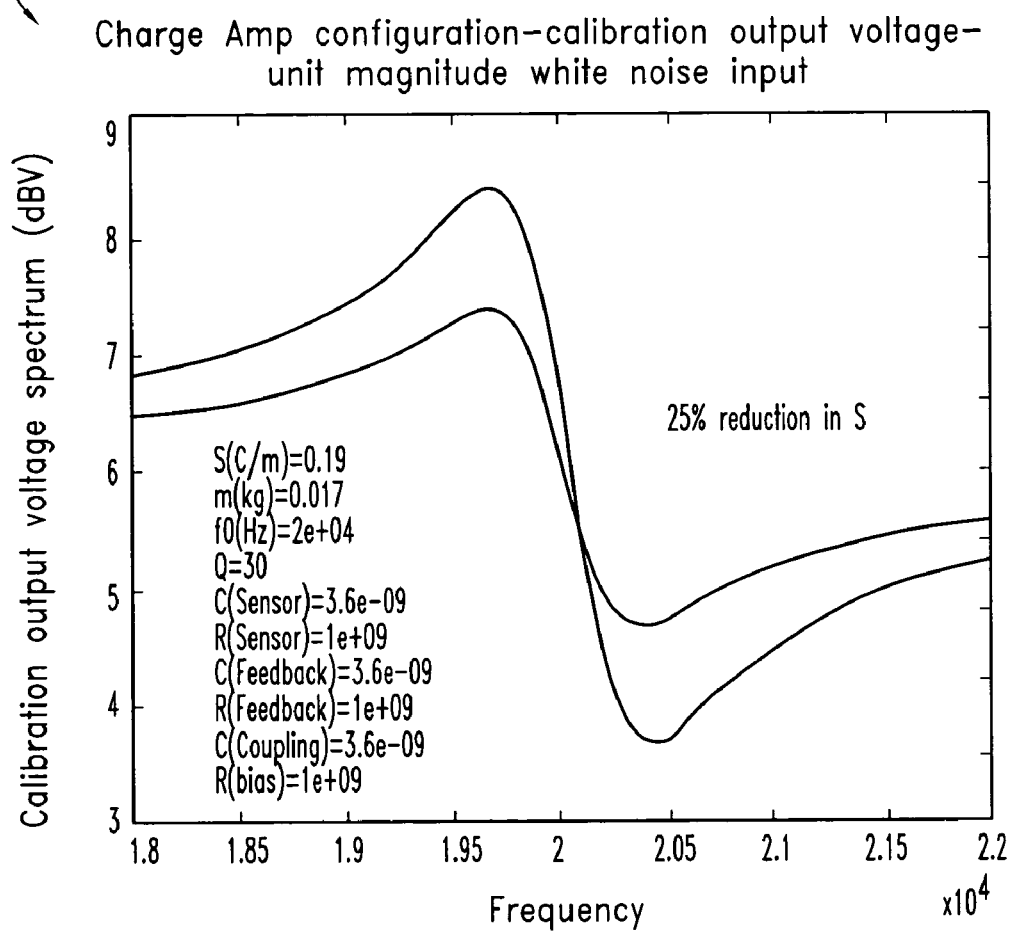
FIG. 11 is a representative output graph of the change in the output spectrum during a deterioration of the transducer coupling strength in the transducer self-test system.

The graph 152 in FIG. 11 shows the change in the output spectrum near the accelerometer resonance for a 25% reduction in the electromechanical coupling strength, S. When the Q is relatively low, 30 in this case, the dominant change is the reduction of the peak heights. The graph 152 also shows the change in the output spectrum for a 25% reduction in the electromechanical coupling strength S; parameters used are those of an OST A8120 accelerometer.

Figure 12:
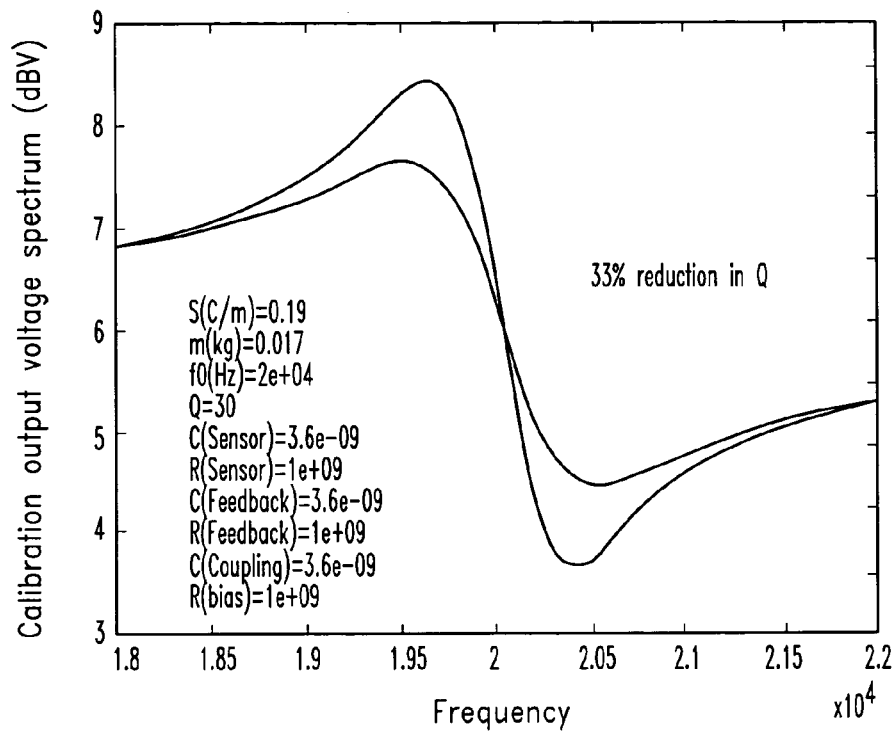
FIG. 12 is a representative output graph of the change in the output spectrum during a reduction of an accelerometer mechanical Q in the transducer self-test system.

The graph 154 in FIG. 12 shows the change in the output spectrum near the accelerometer resonance for a 33% reduction in the accelerometer mechanical Q. Note that a change in Q leads to a spectrum change only near resonance and the spectra are coincident away from the peak, unlike the case for a change in S.

The shape of the spectrum near resonance also is dependent upon the mechanical quality factor, Q, of the accelerometer. Significant changes in the mechanical Q would signal a compromise of the mechanical integrity of the accelerometer. The graph 154 shows the change in the output spectrum for a 33% reduction in the accelerometer mechanical quality factor, from 30 to 20. Note the difference between the signature of a Q change versus a change in the value of S. A shift in the Q leads to a spectral change only near resonance—the spectra are coincident away from the peak, unlike the case illustrating changes in S.

The analytical formulae presented above, constitute a full set of predictive tools for the output of the three-wire, self-test circuits as a function of the accelerometer and preamplifier parameters. The two-wire preamplifier is more complex and its analysis is most easily carried out using a circuit simulation tool such as Pspice. A sample simulation 156 of the two-wire charge mode preamplifier self-test circuit 110 is shown in FIG. 13.

In this example, based on the simulation, the piezoelectric accelerometer is represented by its capacitance, 400 (pF) 158 in this case, and an equivalent inductance chosen to yield the mechanically resonant frequency of the accelerometer. A series resistor 160 is included with the inductor to mimic the accelerometer's mechanical quality factor. In the simulation shown, the self-test source 162, V4, is coupled to the preamplifier input through a 22-pF capacitor 164. The feedback capacitor 166 is chosen to be 400 pF so that the charge amplifier has unity gain. The feedback resistor is chosen to give low frequency response, down to approximately 1 Hz.

Figure 13:
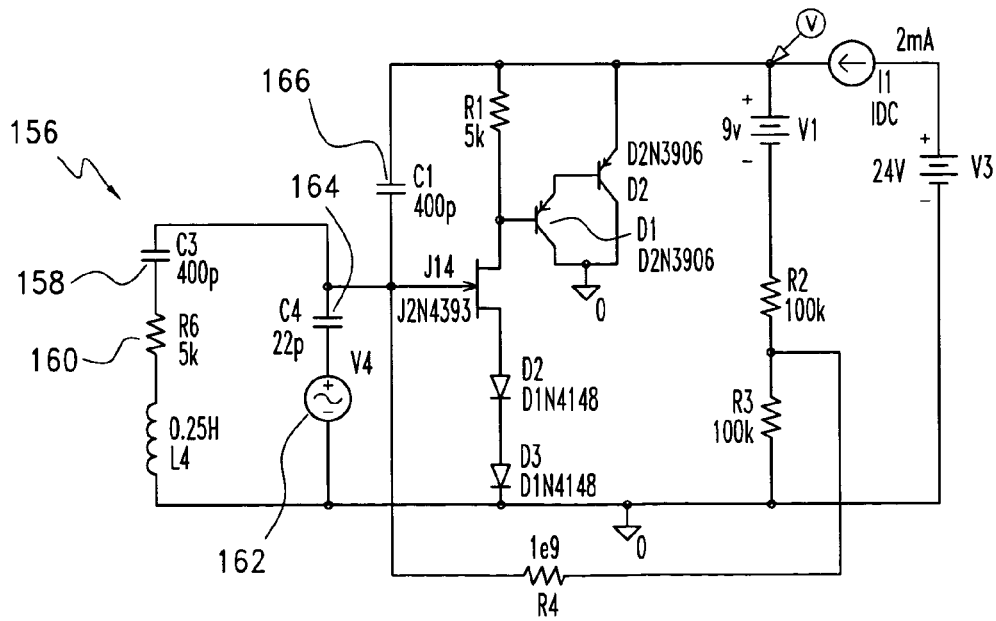
FIG. 13 is a circuit diagram of the transducer self-test system for a two-wire charge preamplifier.

There are two other differences between the simulation circuit, FIG. 13, and the generic two-wire charge preamplifier circuit shown is FIG. 7. First is the use of two bipolar transistors to yield an effectively higher value of transistor current gain (Beta), the second is a "bootstrap" circuit consisting of R3 and R2 which allows the use of a smaller feedback resistor, R4, than would otherwise be required to obtain low-frequency response. Typically in the two-wire charge preamplifier circuit a constant current diode is used in the power supply line, this is represented by the 2 mA current source. Various other bias points are set by sources, or the voltage drop across forward biased diodes, as used on the JFET source.

Figure 14:
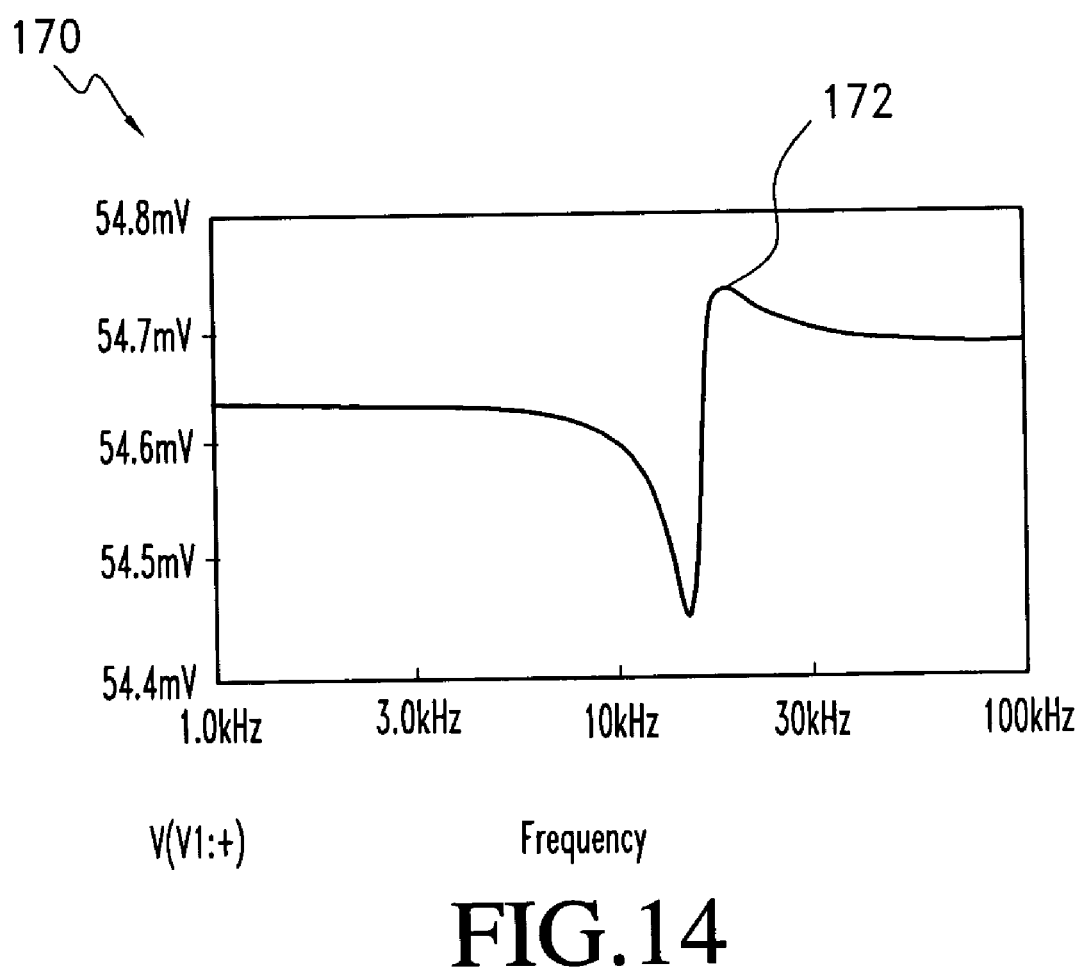
FIG. 14 is a representative frequency output graph of the frequency response of the two-wire charge amplifier during a simulation of the circuit transducer self-test system.

The simulation result graph 170 using a unit voltage swept sine wave for the self-test source, V4, is shown in FIG. 14. The resonant peak 172 corresponding to the electromechanical resonance of the accelerometer appears as it does in the three-wire voltage mode self-test circuit. This is because in the three-wire voltage mode circuit the sensor is connected to the non-inverting op-amp terminal and the two-wire amplifier is similarly non-inverting. If V4 were a broadband noise source and the spectrum of the output voltage was computed, a similar frequency response would be obtained. As in the previous cases the output spectrum, or frequency response, may be interpreted to yield information about the "health" of the accelerometer and the preamplifier circuit. In FIG. 14 a Pspice simulation of the frequency response of the two-wire charge amplifier with self-test configuration is shown. The circuit parameters used are shown in FIG. 13. An output similar to the three-wire voltage mode amplifier is obtained in this configuration.

The self-test circuits presented in this report permit the user to determine the "health" of a piezoelectric acceleration sensor, including the preamplifier, by measuring the frequency response of the sensor-circuit combination. This is accomplished by coupling a broadband noise or swept sine wave source to the input of a self-test circuit. The frequency response of the circuit yields a measure of the accelerometer's output impedance, which is a function of its mechanical parameters, electrical parameters, piezoelectric coupling strength and mounting conditions. Electrical parameters of the preamplifier also may be inferred from the frequency response data.

Self-test circuit frequency response data may be fit numerically to the analytical formulae given above or to circuit simulation results to yield estimates of the accelerometer and preamplifier component parameters. Failures and degradations such as accelerometer base detachment, sensor mechanical failure as indicated by the mechanical quality factor, electrical lead detachment, electronic component deterioration, failure of the sensor preamplifier and gradual depolarization of the PZT elements may be determined by this method. This method may also allow one to track changes in the calibration of an accelerometer with an initially known calibration.

The circuits and techniques described in this disclosure apply specifically to piezoelectric accelerometers, however they are applicable to in-situ testing of a variety of transducer devices including but not limited to piezoelectric, capacitive, and inductive transducers. In general such sensors employ an energy storage device such as a piezoelectric material, capacitor, or inductor, to store electromagnetic energy that in turn is transformed into an electronic signal by the modulation of the energy storage element. Specific examples of such transducers include condenser microphones, electret microphones, capacitive accelerometers, capacitive displacement and proximity sensors, capacitive pressure sensors, moving coil microphones, inductive rate sensors, piezoelectric pressure sensors and others. A common feature of such sensors is that the total electrical impedance of the output of the transducer is a function of the transducer's mechanical and electrical parameters and the frequency. They include situations where a sensor, in conjunction with the invention described, can have the output set to a predetermined value based on the results of the self-test as will be further described below.

Figure 15:
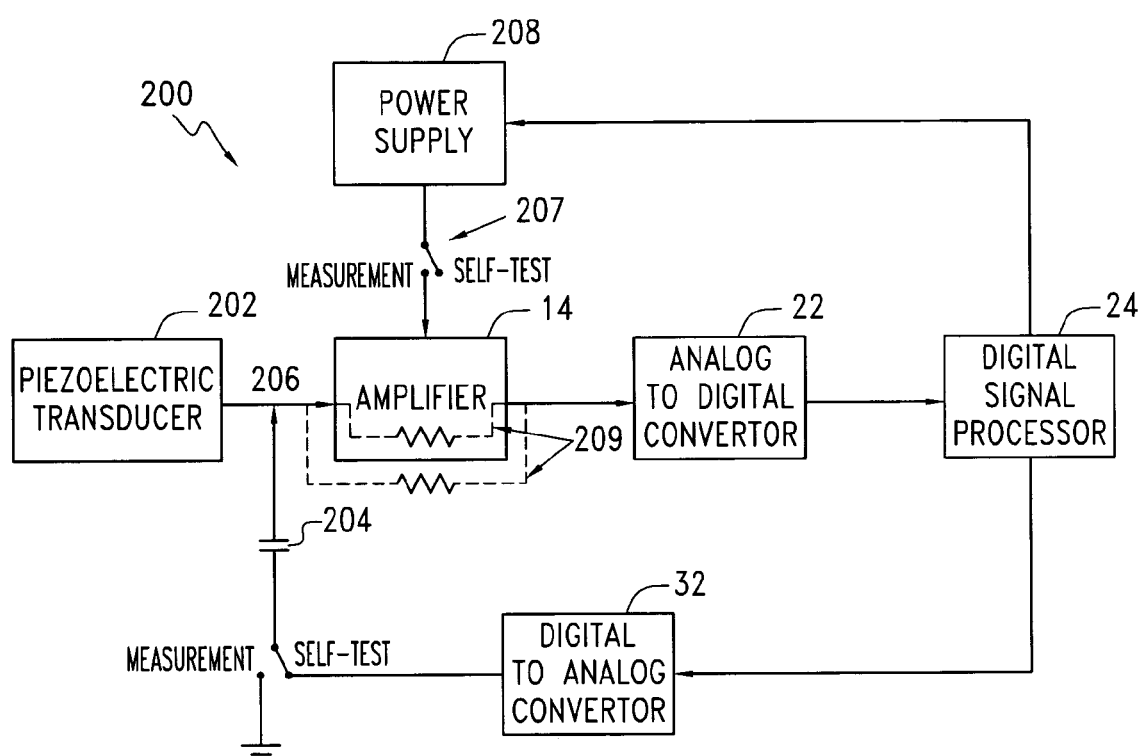
FIG. 15 is a block diagram of a in-situ testing apparatus.

A block diagram of a piezoelectric transducer in-situ testing apparatus 200 is shown below on FIG. 15. This piezoelectric transducer in-situ testing apparatus 200 has two different operation modes, a measurement mode and a self-test mode. In the measurement mode an output from the piezoelectric transducer 202, also referred to as 12 in parts of this description such as in the FIG. 2 discussion, goes to an amplifier 14 which can be a charge amplifier, and then through the analog to digital converter (A/D) 22 to the digital signal processor 24.

Figure 16:
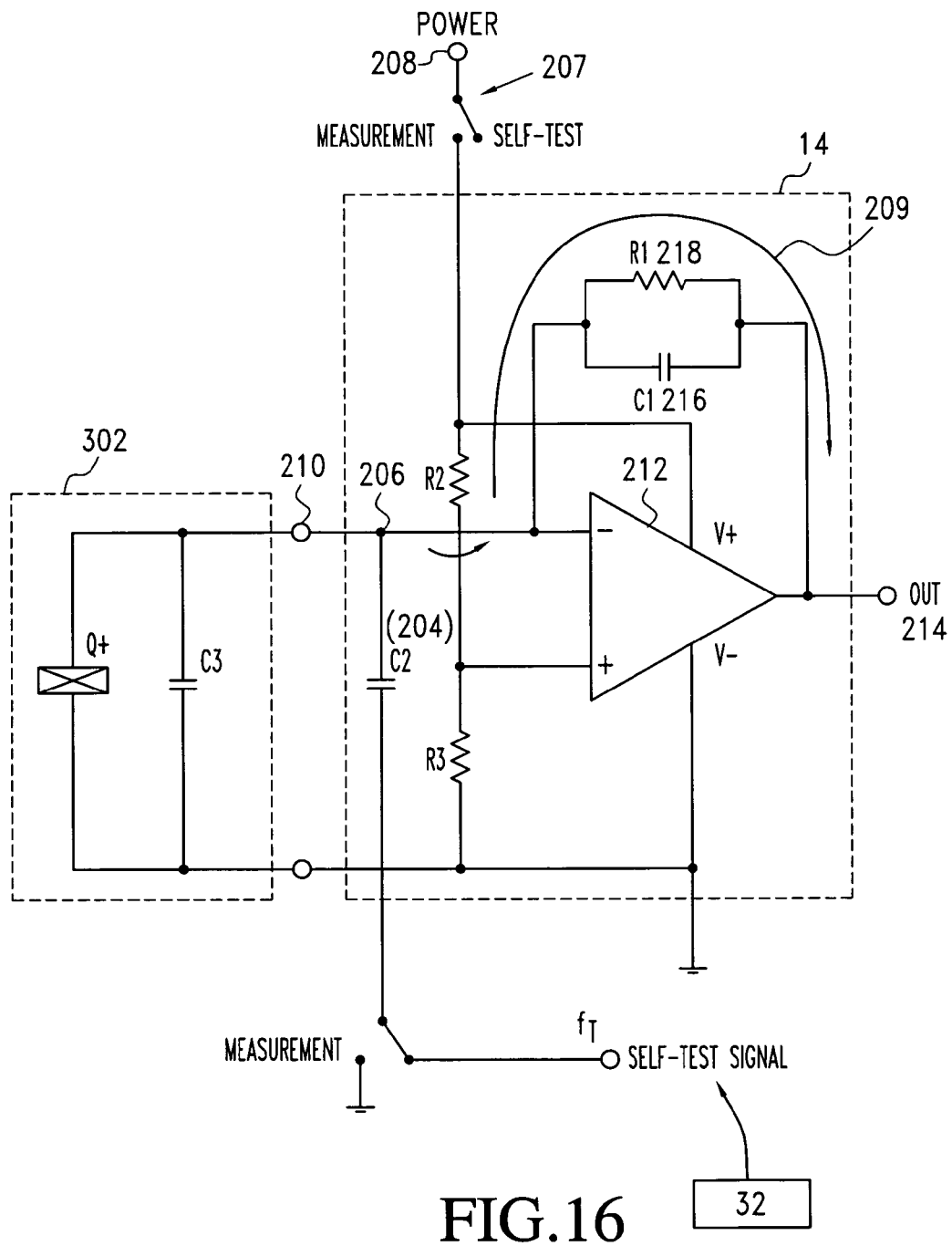
FIG. 16 is a schematic of a portion of the in-situ testing device.
Figure 17:
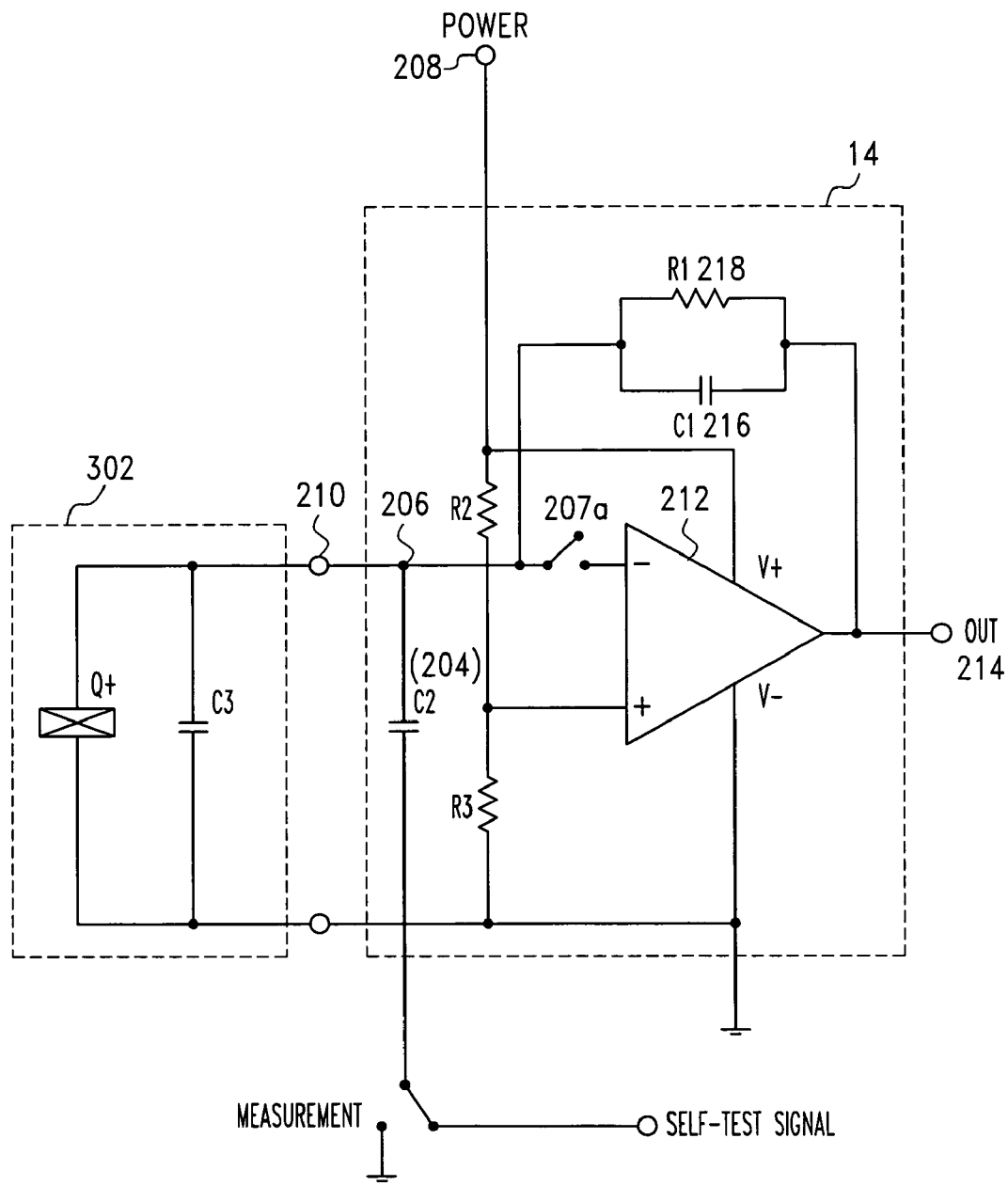
FIG. 17 is a schematic of another embodiment of the in-situ device.
Figure 18:
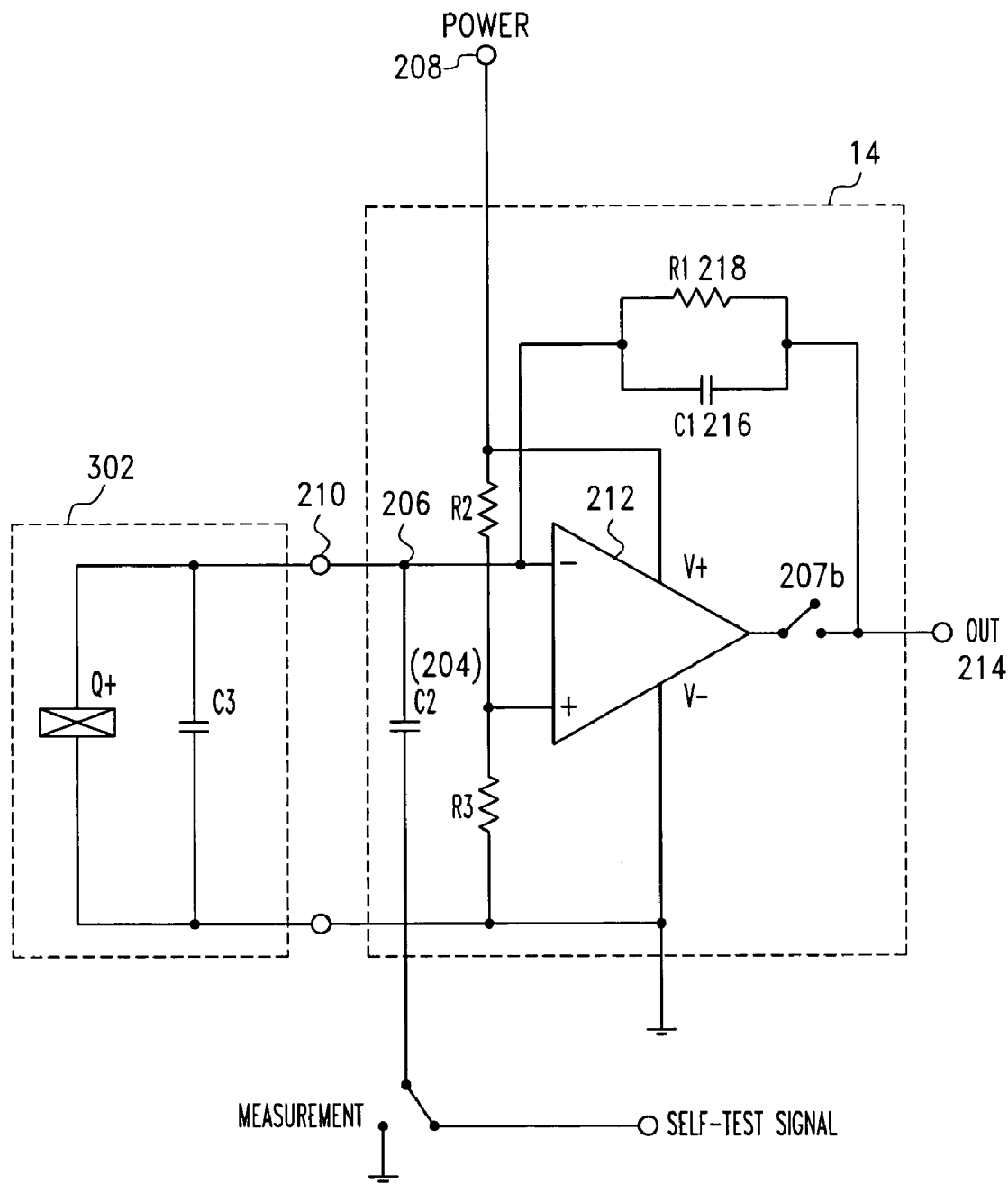
FIG. 18 is a schematic of another embodiment of the in-situ testing device.

In self-test mode a test signal is applied through a capacitor in 204, such as a small value capacitor, to the circuit node 206 between the piezoelectric transducer 202 and the amplifier 14 as shown in FIG. 16. The capacitor can actually be any element that supplies an impedance between the signal source and the amplifier. In the self-test mode with a test signal switch 207, and a power supply 208 connected to the amplifier 14, the amplified can be turned off or disabled with the aid of the test signal switch. Disabling the amplifier can be accomplished in a number of ways with a switch including placing the test signal switch 207 between the power source and the amplifier as shown in FIG. 17 or alternatively between the signal source and the transducer so that the amplifier is always off when a test is made as shown in FIG. 18. The amplifier can also be disabled or "turned off" a number of other ways that prevent the amplifier from being an effective part of the circuit and thus prevents noise from the circuit interfering with the analysis of the piezoelectric transducer output. Some of these will be discussed in detail in the following discussion.

The self-test signal output goes through the amplifier feedback circuit (stand alone or internal) indicated by line 209, to the analog to digital converter (A/D) 22 and then to the digital signal processor 24. Test-signals such as a pseudorandom noise, a periodic chirp or a swept narrow band signal can be used. The processor 24 analyzes the test-signal and provides signal which goes through the digital analog converter 32 and capacitor 204 to circuit node 206.

A schematic of a portion of the circuit is shown in FIG. 16 including the piezoelectric transducer 202 and the amplifier 14. In measurement mode the transducer output 210 is connected to the inverted input of an operational amplifier 212. The transducer self-test input is connected through capacitor $C_2$ (204) to the ground. The power supply 208 of an operational amplifier 212 is turned on. Note that the amplifier power switch and signal generator switch are coupled in this example so that when the amplifier power switch is off, then the test signal switch 207 is on allowing the self test to be run when the amplifier power source is not on. This connection could be mechanical, electrical or any other type of connection that would effectuate this situation.

Figure 19A:
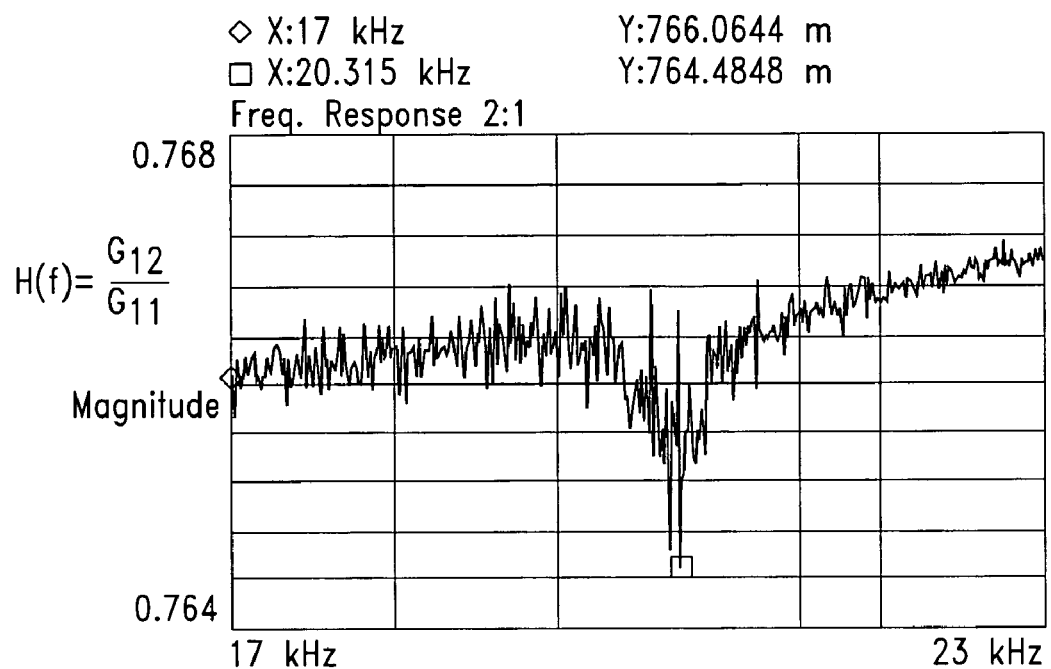
FIG. 19A shows a graphic self-test response signal.

In self-test mode a source of the test signal 214 (from the D/A converter) is connected through capacitor $C_2$ (204) to the circuit node 206. In the self-test mode a test signal is applied through capacitor $C_2$ (204), such as a small value capacitor, to the circuit node 206 between the piezoelectric transducer 202 and the amplifier 14. Capacitor $C_2$ (204) can actually be any element that supplies impedance between the signal source and the amplifier. During the self-test mode the power supply 208 of the operational amplifier 212 is disabled, in this case turned off, therefore the transducer output 210 goes to amplifier output 214 through feedback capacitance 216 ($C_1$) and resistance 218 ($R_1$). One of the big problems during self-test is that there is a noise that is a result of the influence of the transducer output measurement signal. This noise causes difficulty interpreting the signals because there always are two signals that are mixed together. The first signal is the self-test signal. The second is the transducer output measurement signal. This problem is especially troublesome in connection with a high frequency output signal whose basic frequency ($f_1$) is close or higher than the self-test frequency ($f_{test}$). FIG. 19A shows a common noisy self-test response signal.

Figure 19B:
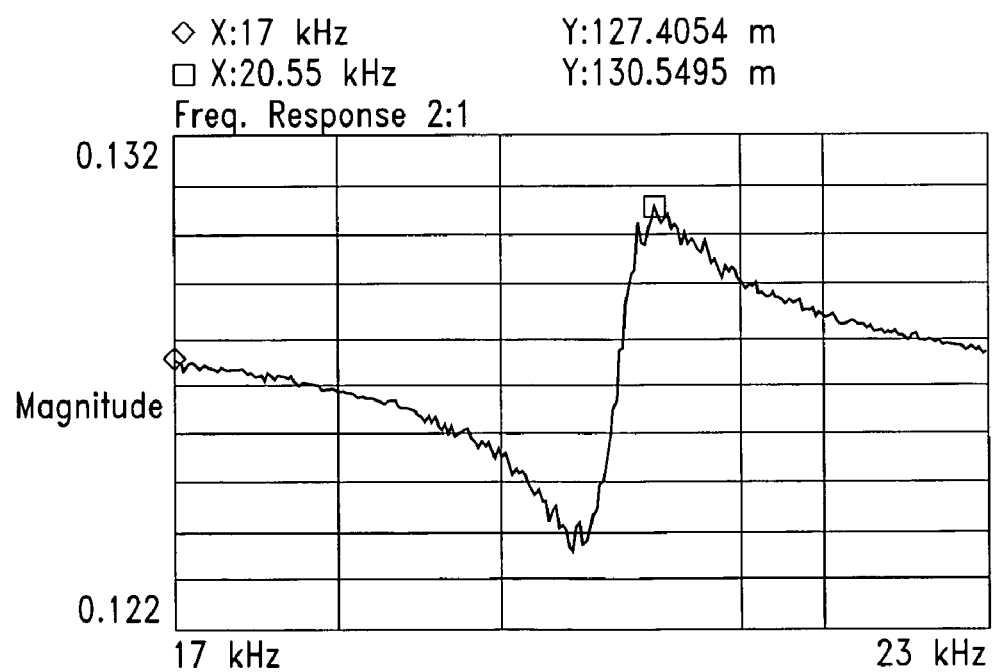
FIG. 19B shows a graphic self-test response signal.
Figure 20A:
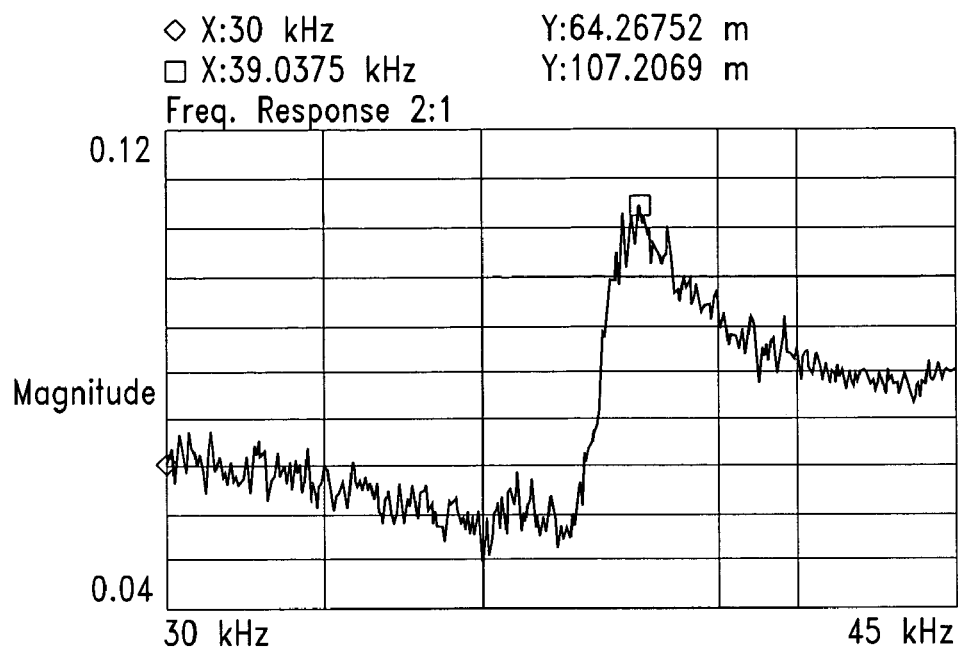
FIG. 20A shows a graphic self-test response signal.
Figure 20B:
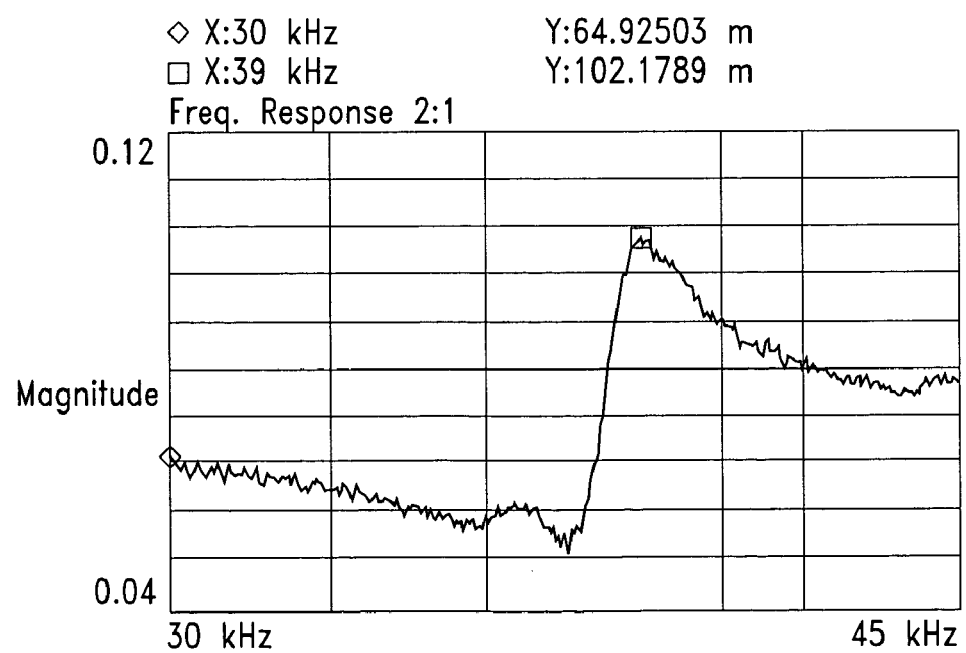
FIG. 20B shows a graphic self-test response signal.

During the self-test method of the present invention, the amplifier is turned off. This substantially decreases noise from the transducer 202 output measurement signal (e.g., vibration). This decrease in noise helps accomplish a better testing method as described below. FIG. 19B shows a self-test response signal when the amplifier is turned off, the test signal is very clean. During the self-test method of this invention, as shown in FIGS. 15–19, the amplitude level of the self-test signal at node 206 must be maximized to the maximum allowed by the transducer and amplifier circuits. For example, if during self-test there is a high level of vibration and the self-test input signals equals 500 mV ($f_{mix}$), the self-test response signal is noisy as shown in FIG. 20A. The noise substantially decreases when the self-test signal amplitude is increased, equal to 5 V as shown on FIG. 20B. It is important to maximize $f_{test}$ to all but saturate the circuit for best results.

During self-test the peaks (amplitude and frequency) of the transducer response signal ($V_{response}$) from the input test signal are measured. These peaks must be located in the frequency band near the resonance frequencies of the piezoelectric transducer when the transducer is mounted and unmounted.

The self-test method of this invention consists of two phases:

PHASE 1: Initial transducer signature measurement is determined during an initial transducer installation (mounting) on object. This signature is the frequency and amplitude of peaks (see the spectrum response shown on 21A for an example of this response). The signature is measured twice:

The signature (frequency $f_{sun}$ and amplitude $A_{sun}$) of the unmounted transducer. It is measured before the transducer is mounted on an object. Usually the frequency $f_{sun}$ is close to the transducer natural resonance frequency.

The signature (frequency $f_{sun}$ and amplitude $A_{sun}$) of the mounted transducer. It is measured after the transducer is installed or mounted on an object. Usually the frequency $f_{sun}$ is close to mounted resonance frequency of the transducer. All signature data are recorded in memory.

PHASE 2: Recurring in-situ self-test measurements can be made by measuring the frequency and amplitude ($f_t$ and $A_t$) of one or more peaks and comparing these with transducer signature data ($f_{sun}$, $A_{sun}$, $f_{sm}$, $A_{sm}$).

A self-test in-situ method for use with a piezoelectric transducer circuit including an amplifier. The method including a measurement mode (of sensor) when the amplifier is on and a self test mode when the amplifier is off to reduce inherent noise in conjunction with an established baseline standard by; including the following steps:

1. Measurement of the output parameter (such as amplitude) of a piezoelectric transducer in response to application of an input testing amplitude (voltage) with frequency range overlapping the resonant frequency of the piezoelectric transducer before mounting in the measurement situation (such as having the piezoelectric transducer mounted on an object).

2. Measurement of the output parameters (such as amplitude) of a piezoelectric transducer in response to application of an input testing amplitude (voltage) with frequency range overlapping the resonant frequency of the piezoelectric transducer after mounting in the measurement situation.

3. Establish a ratio of output/input parameters (such as the amplitudes) over test frequency range to establish a standard spectra in mounted and unmounted situations ["ratio spectra" mounted/unmounted].

4. Recurring in-situ self test measurements (ie periodically and/or as needed, for instance when a problem arises] of in-situ output/input parameters (such as amplitudes) to create "ratio spectra".

5. In these recurring in-situ circumstances (ie periodically and/or when a problem arises] use the measured in-situ output/input parameters (such as amplitudes) and created "ratio spectra" to compare to the standard output/input standard "ratio spectra" for mounted and unmounted situations to determine if there have been changes to the sensor, including those discussed below during operations. This can be done with plots, calculations or a combination of these. These tests may be digitized and/or programmed into the software or hardware.

Figure 21A:
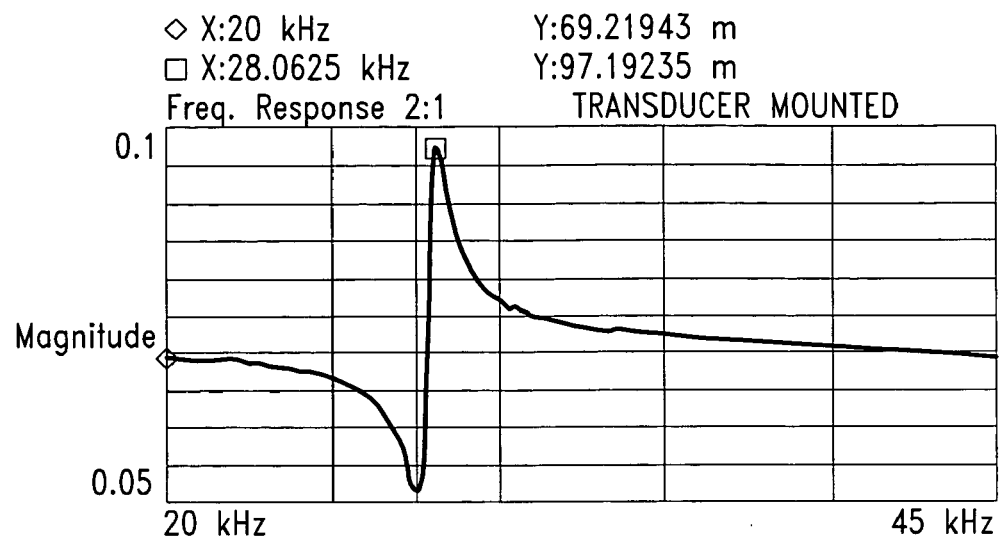
FIG. 21A shows a graphic self-test response signal.
Figure 21B:
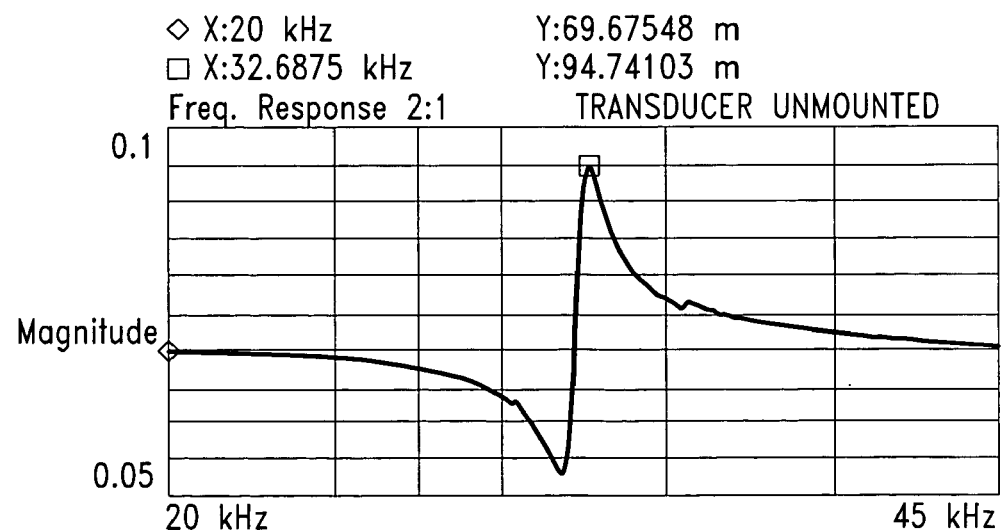
FIG. 21B shows a graphic self-test response signal.

Referring to FIG. 21A (mounted) and FIG. 21B (unmounted), the following steps help clarify the present invention:

STEP ONE OF SIGNATURE STANDARD (FIG. 19B) Before mounting piezoelectric transducer:

Unmounted peak frequency $f_{sun}$—frequency signature of an unmounted transducer. Unmounted-peak amplitude $A_{sun}$—amplitude signature of an unmounted transducer.

STEP TWO OF SUGNATURE STANDARD (FIG. 19A)—After mounting piezoelectric transducer:

Mounted peak frequncy $f_{sm}$—frequency signature of mounted transducer.

Mounted peak amplitude $A_{sm}$—amplitude signature of mounted transducer.

STEP THREE—when in self test mode:

In-situ peak frequency $f_t$—peak frequency during self-test. In-situ peak amplitude $A_t$—amplitude during self-test.

So, when the mounted/unmounted ratio spectra are used separately or preferably superimposed, they can determine one of the following:

1. If $f_t \approx f_{sm}$ and $A_t \approx A_{sm}$ then the piezoelectric transducer is mounted properly and works well (sensitivity unchanged).

2. If $f_t \approx f_{sm}$ but then the piezoelectric transducer is mounted but its sensitivity has dropped due to transducer failure or environmental influence.

NOTE that a change in temperature would create changes in sensitivity so it is important to have environmentally normalized signatures.

3. If $f_t \approx f_{sun}$ then the piezoelectric transducer is not mounted properly or may fall off.

4. If $f_t \neq f_{sun}$ and $f_t \neq f_{sm}$ then the piezoelectric transducer is poorly mounted or compromised The location of the amplitude peaks may be determined using one of the following methods:

A. Measurement of a transformer function H(f) (a frequency response).

$$H(f) = \frac{G_{12}}{G_{11}}$$

where $G_{12}$ is a cross spectrum of the output test signal and the piezoelectric transducer output, $G_{11}$ is a power spectrum of the input test signal (excitation signal).

The input test signal being used may be a pseudorandom noise or periodic chirp.

B. Direct determination of the peaks by measuring output from the sequence of single sine input test signals in the frequency range from $f_{min}$ to $f_{max}$. Their values may be found from the following relations:

$f_{min} = 0.8 \cdot f_{sm}$
$f_{max} = 1.2 \cdot f_{sun}$

Excitation frequency fi may be defined as:

$$f_i = f_{min} + \frac{f_{max} - f_{min}}{N} \cdot i$$

where N—number of steps from $f_{min}$ to $f_{max}$.

Results of the transducer self-test are illustrated with FIGS. 21 and 22.

$f_i$ is the frequency at the $i^{th}$ element in the frequency range to be analyzed, when the range is divided into N elements. This makes it easy to determine and characterize the graphs shown digitally and mathematically so that programming in these equations is easily accomplished.

FIG. 21 represents the results of the self-test to examine the quality and quantity of the transducer mounting to the object. On FIG. 21A the transducer is mounted correctly to the object and resonance peak frequency is equal 28.06 kHz. On FIG. 21B the same transducer has not mechanical joining to the object and resonance peak frequency have been increased more than 4 kHz.

Figure 22A:
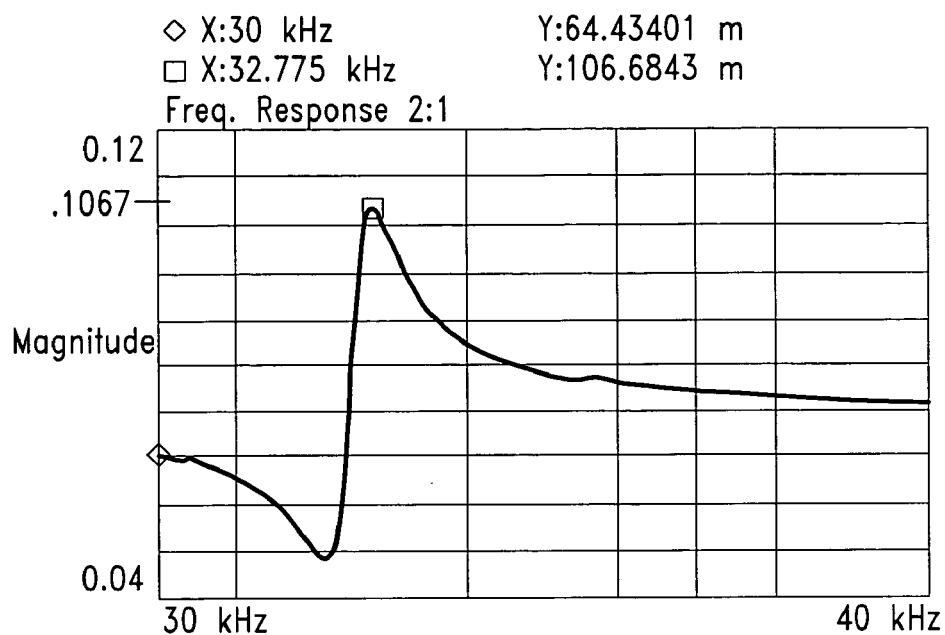
FIG. 22A shows a graphic self-test response signal.
Figure 22B:
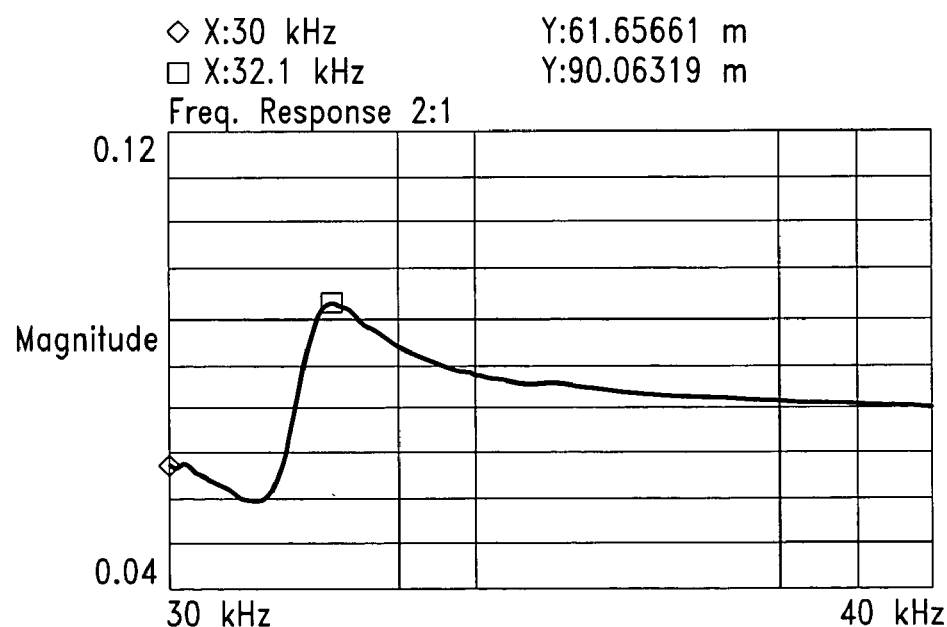
FIG. 22B shows a graphic self-test response signal.

FIG. 22 represents the results of the self-test to examine variation of the transducer sensitivity. On FIG. 22A the transducer has a sensitivity according to certificate and the resonance peak value is 106.7 m. On FIG. 22B the sensitivity of the same transducer is 15% less as the resonance peak value falls to 90 m.

Figure 23:
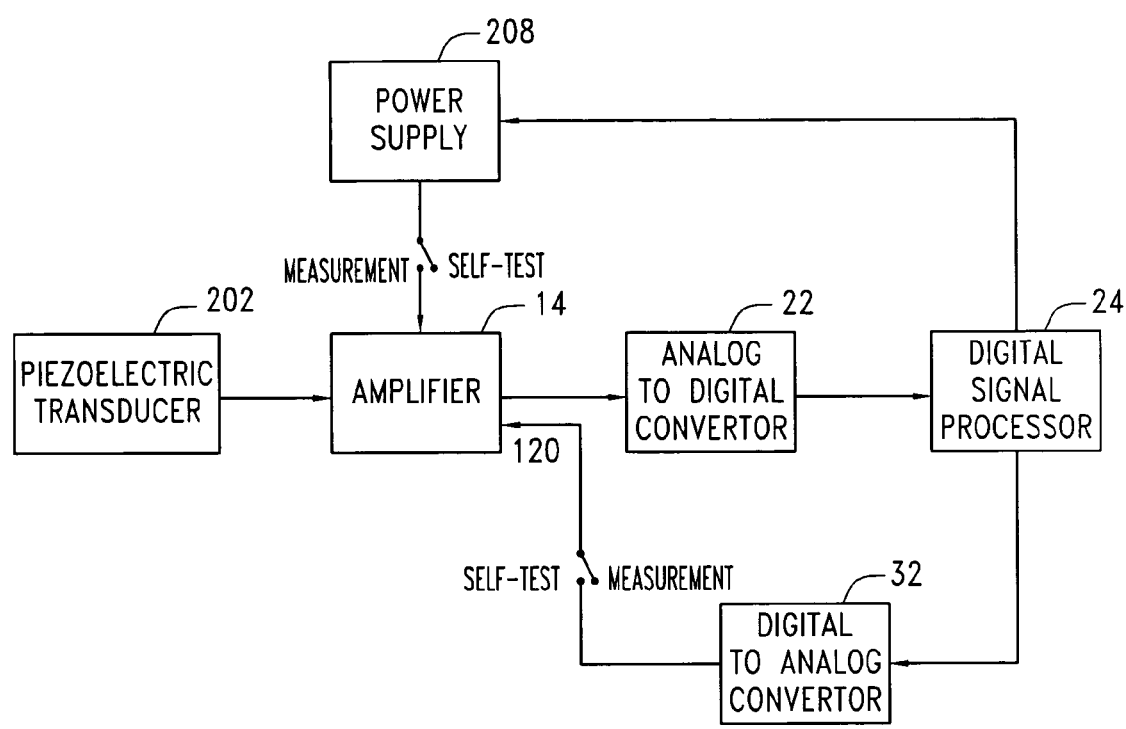
FIG. 23 is another in-situ testing apparatus.

On FIG. 23 is shown another embodiment in the in-situ testing apparatus in which the test signal is applied to the output of the amplifier 14. This embodiment is very useful because there are some piezoelectric transducer apparatus designs in which it is impossible to provide the test signal between the piezoelectric transducer 202 and the amplifier 14 (to circuit node 206 on FIG. 15). In self-test mode the power supply 208 of the amplifier 14 is turned off. The self-test signal output goes to analog to digital converter 22 and then to the digital signal processor 24. The digital signal processor 24 provides test-signal through the digital analog converter 32 and analyzed the test signal output. The test-signal may be a pseudorandom noise, a periodic chirp, or a swept narrow band signal.

Figure 24:
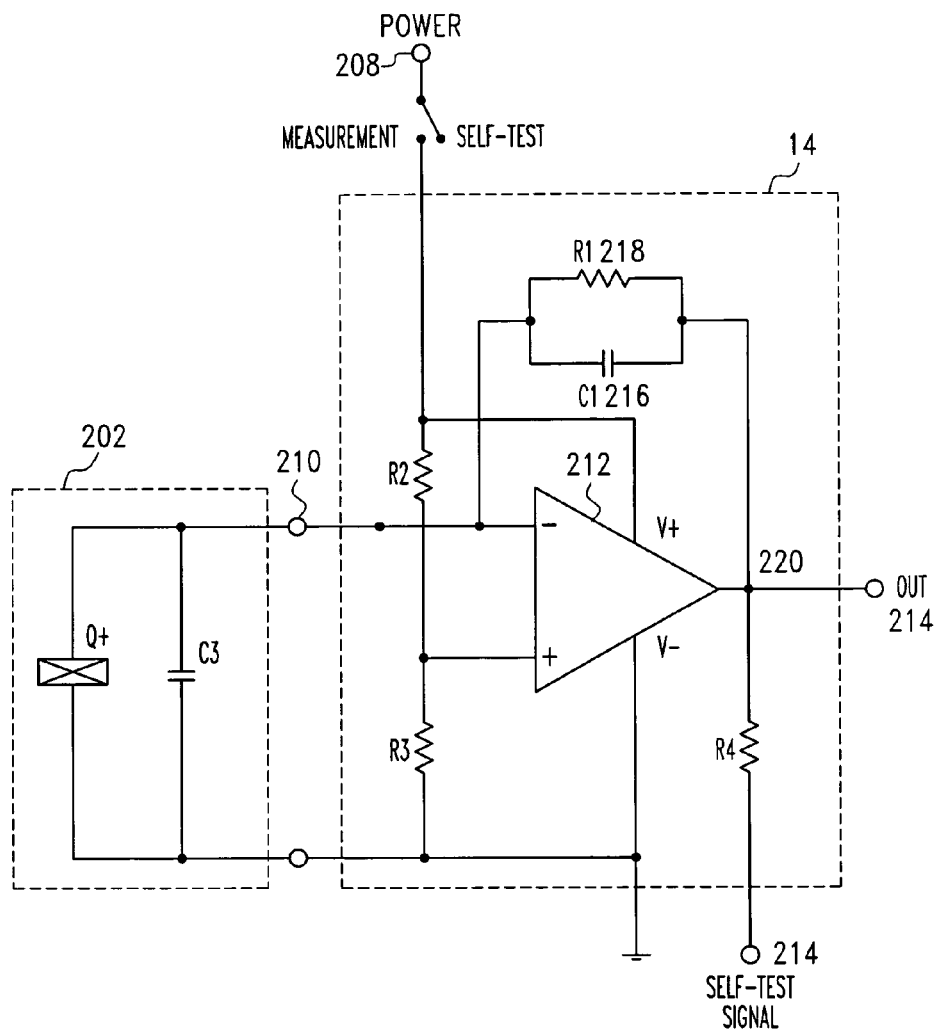
FIG. 24 is a portion of another in-situ testing apparatus.

The schematic of the piezoelectric transducer 202 and the amplifier 14 is shown in FIG. 24. In measurement mode the transducer output 210 is connected to the inverted input of an operational amplifier 212. The power supply 208 of the operational amplifier 212 is turned on as described above. In self-test mode a source of the test signal (from the digital to analog (D/A) converter) goes to the circuit node 220. The power supply 208 of the operational amplifier 212 is turned off. Therefore, the test signal travels through feedback capacitance 216 ($C_1$) and resistance 218 ($R_1$).

Self-test results for this modification of the in-situ testing apparatus are presented on FIG. 25.

Figure 25A:
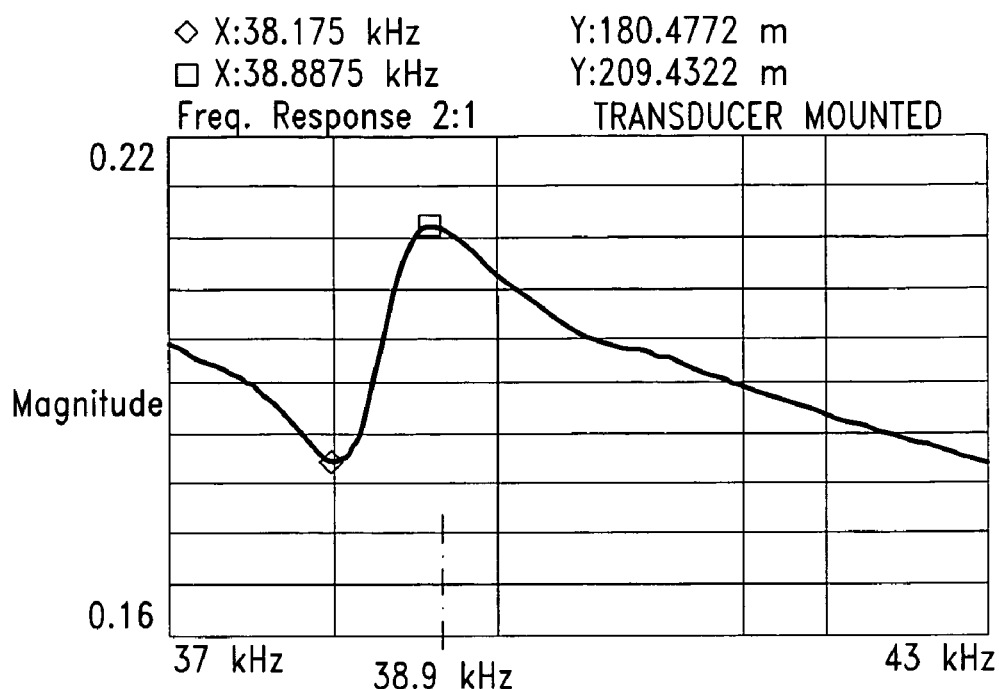
FIG. 25A is a graphic of a self-test signal.
Figure 25B:
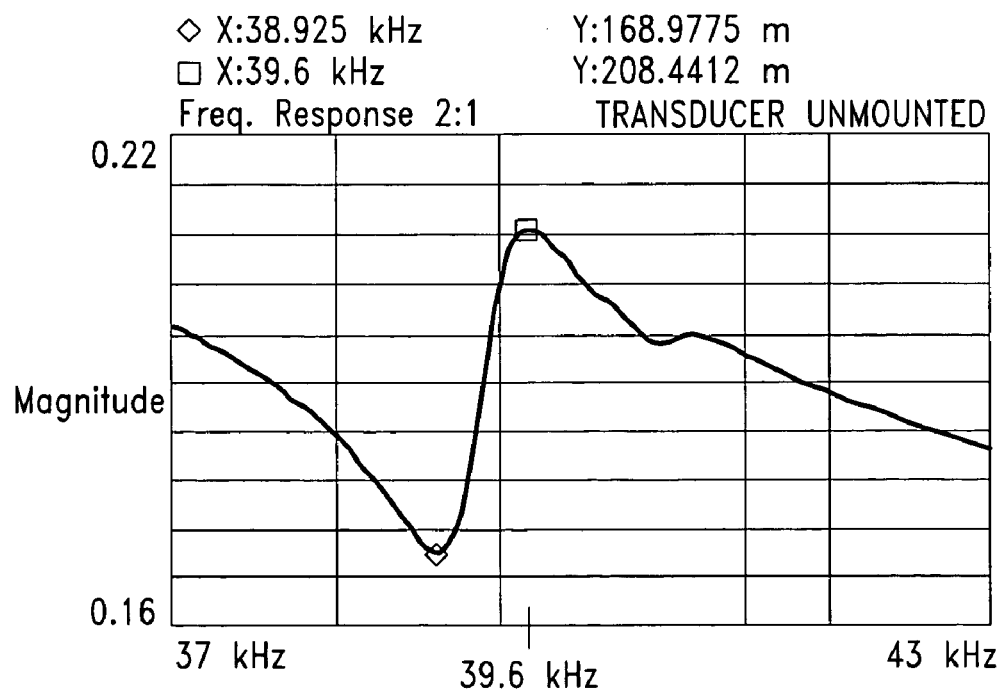
FIG. 25B is a graphic of a self-test signal.

On FIG. 25A transducer is mounted o the object and resonance peak frequency is 38.9 kHz. On FIG. 25B the same transducer lost a mechanical connection to the object and the resonance peak frequency have been increased to 39.6 kHz.

Figure 26:
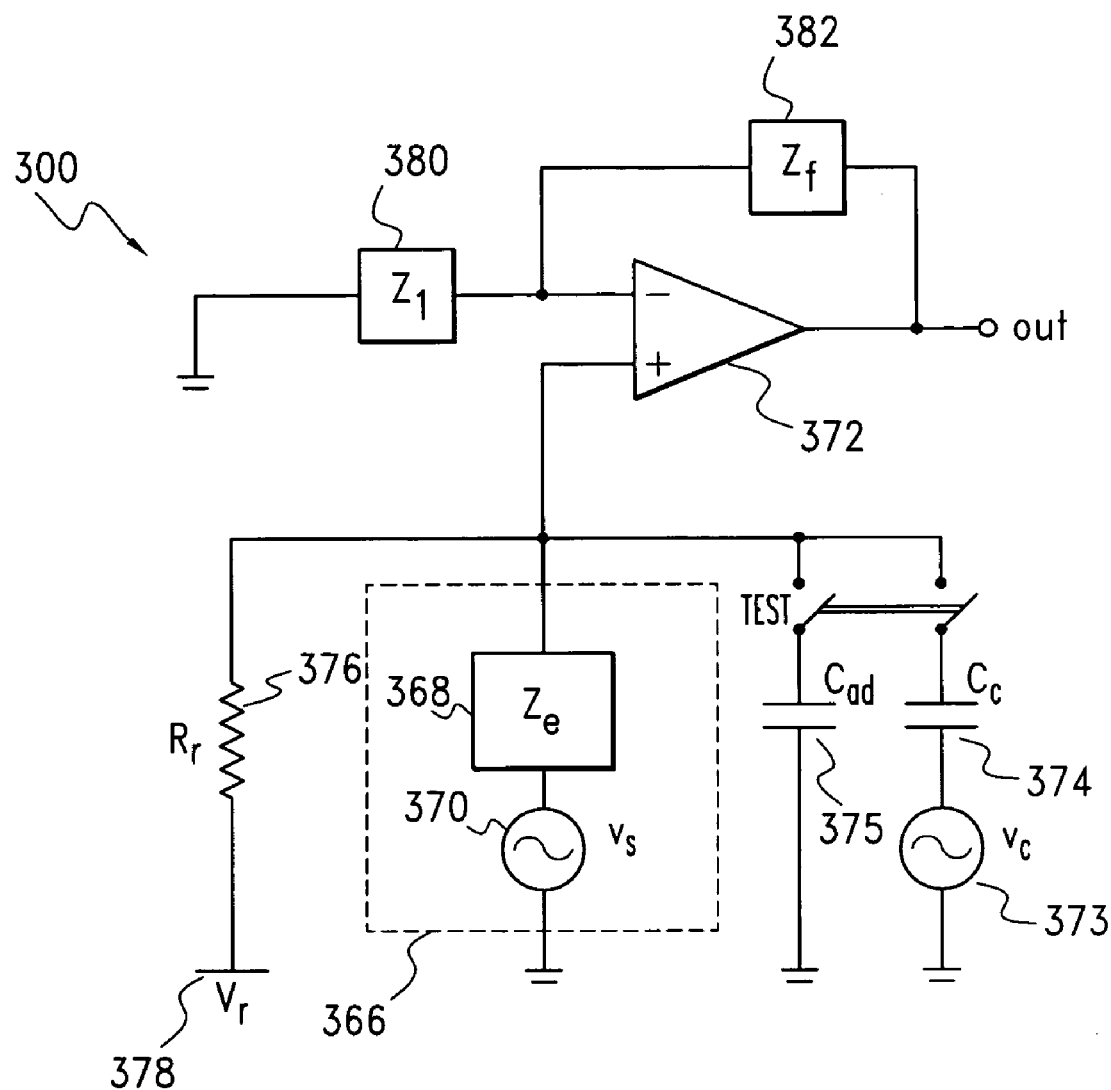
FIG. 26 is another embodiment of the in-situ testing apparatus.

A self-test circuit 300 is shown in FIG. 26 with a piezoelectric transducer 366 (impedance 368 and signal generator 370) coupled to a voltage mode amplifier 372 in an arrangement similar to the one described above in conjunction with FIG. 5. This self-test circuit 300 is one example of the use of a voltage amplifier instead of a charge amplifier. A voltage amplifier can be substituted for charge amplifiers in all the embodiments described in this invention in a manner similar to this one by making similar adjustments and adding an additional capacitor 375 ($C_{ad}$) coupled parallel to the voltage mode amplifier input (or parallel to the transducer output). This capacitor preferably has a capacitance at least 2–5 times more than total capacitance of piezoelectric transducer and is disabled during measurement.

In FIG. 26, a self-test signal source 373 is connected to the voltage amplifier through a coupling capacitor 374. A high value resistor 376 connects the voltage amplifier to a reference voltage source 378 to assure that the transducer signal range remains within the linear range of the amplifier. An impedance 380 is attached between the amplifier and ground and a feedback impedance 382 connects the output of the amplifier back to the input. A bias voltage, $V_r$, is applied to the input through the bias resistor $R_r$. The self-test signal, $v_c$, is also applied at this input through a capacitor $C_c$. If the transducer output measurement signal is substantial and its basic frequency is close to the frequency of the self-test signal, as discussed above, there is a noise $V_m$. To decrease this noise during self-test method of the present invention, the capacitor 375 ($C_{ad}$) is added. During measurement this capacitance must be disabled.

Figure 27:
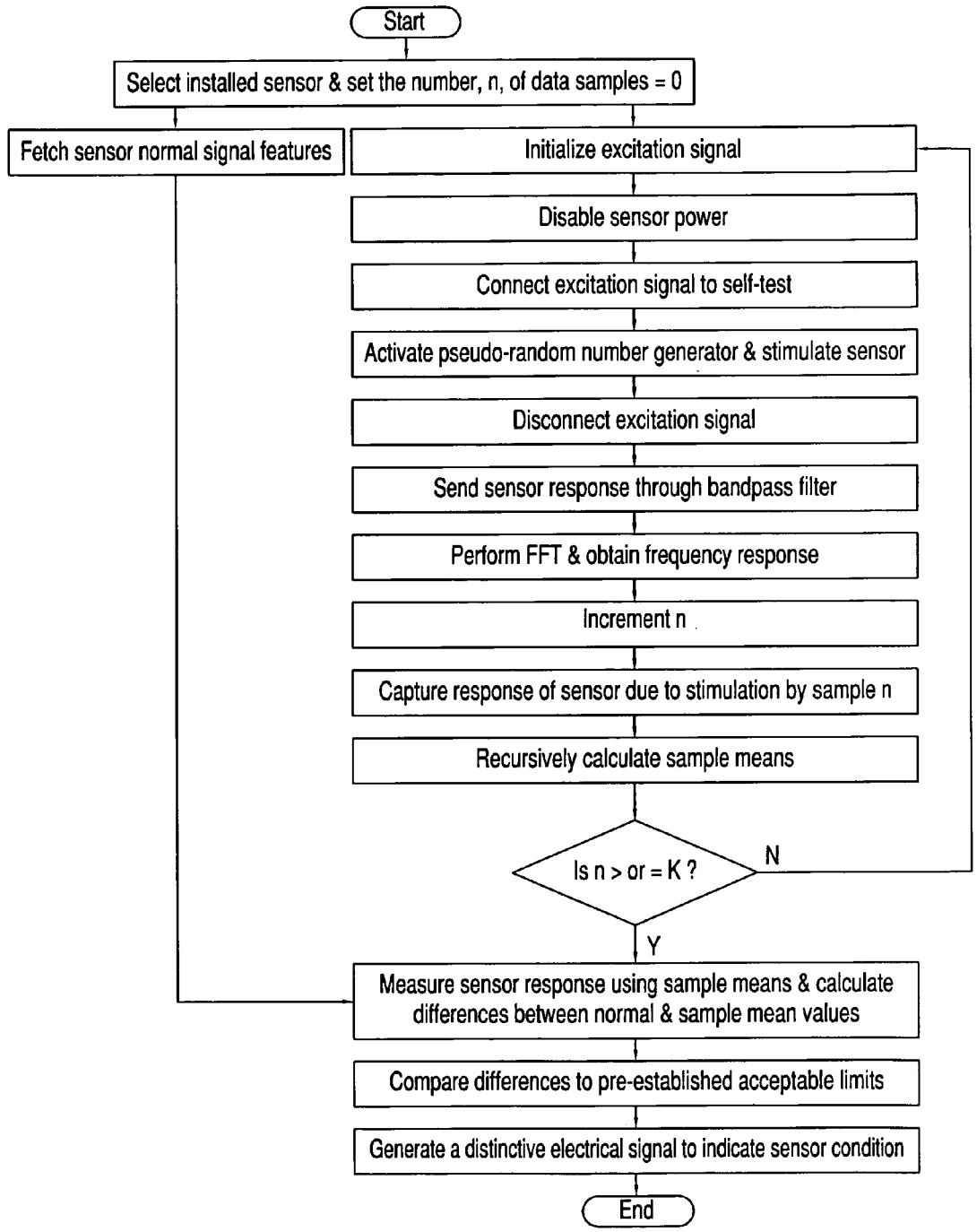
FIG. 27 is a flowchart that describes the self-test process.

Transducer Self-Test: This procedure is illustrated in FIG. 27. The value of "K" shown in this figure represents an experimentally-determined number of samples that provides a statistically meaningful and adequate compilation of independent test runs. The resulting signal that is generated to indicate sensor condition could be one of the four types identified above. The procedure of FIG. 27 can be repeated for testing additional sensors. Although FIG. 27 does not specify the nature of the signal features that are tested, the preferred features include signal amplitude, frequency and phase. The test procedure is designed to detect changes in any of these parameters that are indicative of sensor malfunction.

Until recently, sensors have been limited to a single analog communication channel, normally based on the 4–20 mA convention, and, therefore, have been unable to transmit signals other than a measurement data signal. Faced with this limitation, users of process fault detection techniques have tried to extract sensor and process fault information from measurement data. However, in attempting to minimize distortion of the measurement data, sensor designers have tried to eliminate, by sophisticated filtering and other means, every component of the measurement data signal that does not actually relate to the variable being measured. Thus, improved sensor designs have limited the information available for extraction from the measurement signal for fault detection purposes.

FIG. 27 is a flow chart that describes a further embodiment of this invention, more particularly a method for evaluating the condition of a sensor in accordance with this invention. The method is recursive, that is it repeats a series of steps that collect data from the sensor under test. The collected data is then compared with data representing normal operation and the differences are determined. The differences are compared with pre-established acceptable limits to determine whether the sensor is operating within those limits and a signal is generated to indicate a sensor condition.

The process starts at a start block. The sensor under test is selected from stored data that includes the number of iterations to be performed and data representing normal sensor operation. A test excitation signal is initialized and applied to the sensor. Power to the sensor amplifier is disabled as described above or, in the alternative, the amplifier is disabled by one of the other means described above. The test excitation signal is connected to the sensor. A pseudo-random number generator is activated and a test signal is generated in accordance with the pseudo-random number to stimulate the sensor. The excitation signal is then disconnected from the sensor and the sensor response is filtered with a band-pass filter to remove noise and out-of-band responses. The sensor response is then converted to the frequency domain preferably by performing a Fournier transform, even more preferably a fast Fournier transform and a signal is produced. Index number "n" is incremented in the captured response of the sensor to the excitation signal and is combined with previous responses, if any, to calculate one or more mean values. If the number of iterations is less than the limit the process is repeated until the limit is reached.

The mean values derived from the iterative testing of the sensor are then compared to the stored normalized signals and the differences are determined. The differences are then compared to a pre-established acceptable limits and a signal is generated to indicate the sensor condition, more particularly, whether the sensor is performing within or outside of the acceptable limits. The method then terminates.

Preferably, the pseudo-random number generator is used to provide test excitation signals to the transducer that fall within, but substantially covers its normal operating range. For example, when an analog output of a transducer with built-in test capabilities is programmed to assume a predetermined value when an unacceptable fault condition is detected, such as a 4–20 mA transmitter, may be tested by providing test signals that cause the low sensor produce alternating 4 or 20 mA values.

Recent use of digital communications technology by control system designers has enabled sensors to transmit multiple signals. This, in combination with internal diagnostics generated by microprocessors, which are now commonly embedded within sensors, has resulted in sensors that are able to perform fault detection analyses internally and transmit the results of these analyses as a fault information signal.

The vast majority of sensors currently manufactured and deployed are still single analog signal output devices. The systems that use these sensors can only recognize the intended analog signal. Therefore, what is needed is a design of a conventional transducer with self-test and a method for communicating the results to the outside world. The inventors have discovered the following unique approaches to this challenge:

1. An analog output transducer with built-in test whose output is programmed to assume a predetermined value when an unacceptable fault condition is detected. (Preferred embodiment: A 4–20 mA transmitter may be programmed to provide a constant output such as 4 or 20 mA upon fault detection. Or, in order to more conclusively identify that the output is due to self-test results, the transducer may be programmed to alternate values in a predetermined pattern such as alternating once per second between one of the extreme values 4 or 20 mA and the current output of the transducer. The same could apply to analog voltage or frequency output transducers.)

2. An analog output transducer with built-in test whose output is modulated with a signal reflecting the results of a detected fault condition. (Preferred embodiment: A 4–20 mA transmitter may have a method by which its output signal or power line may be modulated by a signal to initiate and communicated the status of an internal self-test function. This requires the addition of an interface at the signal's receiving and compatible with this communication method. The modulated signal my be voltage or current bias, a fixed or varying frequency, or a modulated pulse train.

3. An analog output transducer with built-in test that provides an additional interface for communication of test results. (Preferred embodiment: a 4–20 mA transmitter may include an LCD and key pad interface that can be used to initiate and communicate the results of testing in digital or human readable form. Alternatively, the additional interface might be connector or wireless interface that uses a digital communication protocol.)

4. An analog output transducer with built-in test that uses the results or the test to appropriately compensate its analog output signal. (Preferred embodiment: A 4–200 mA transmitter may include a compensation algorithm to the sensor output when self-test indicates a fault condition. An example would be to multiply the analog output sensor signal by 1.05 when a 5% reduction in sensitivity is detected. This method may be used in combination with the previous claims when a fault condition or severity is detected that an internal algorithm can no longer adequately compensate.)

The invention has been described in detail with particular reference to certain preferred embodiments thereof. It will be understood that variations and modifications can be effected within the spirit and scope of the present invention.

We claim:

1. In a measurement system comprising a transducer, a charge amplifier having a feedback element, coupled to the transducer and a signal processing circuit coupled to an output of the amplifier, a method of testing the transducer in-situ comprising:
   a. coupling a test signal to the transducer;
   b. disabling the amplifier while leaving the feedback element in place; and
   c. analyzing the response of the transducer to the test signal with the signal processing circuit.

2. The method of claim 1 further comprising coupling an analyzer to an output of the amplifier and measuring the response of the transducer.

3. The method of claim 1 comprising coupling the test signal to the amplifier through an impedance.

4. The method of claim 3 in which the impedance comprises a capacitor.

5. The method of claim 1 further comprising coupling the test signal to a resistor and on to an output of the amplifier.

6. The method of claim 1 further comprising comparing a measured response of the transducer to a signature response.

7. The method of claim 6 wherein the signature response comprises a measured response of an unmounted transducer.

8. The method of claim 6 wherein the signature response comprises a measured response of a mounted transducer to a test signal prior to initiating operations with the transducer.

9. The method of claim 8 wherein the measured response is characterized by one or more specific amplitudes and/or frequencies.

10. The method of claim 9 further comprising generating an error signal when the amplitude and/or frequency of the measured response falls outside a predetermined range.

11. The method of claim 6 wherein the signature response further comprises a measured response of a transducer during normal operation.

12. The method of claim 1 further comprising coupling the test signal to an output of the amplifier at a connection to the amplifier feedback component.

13. The method of claim 1 further comprising coupling the test signal between an output of the transducer and an input to the amplifier.

14. The method of claim 1 in which the test signal has an amplitude approximating the maximum allowed.

15. The method of claim 1 in which the measured response is normalized for various conditions comprising environmental conditions.

16. In a measurement system comprising a transducer, an amplifier comprising a feedback element, coupled to the transducer and a signal processing circuit coupled to an input of the amplifier, a method of testing the transducer in-situ comprising:
  a. coupling a test signal to the transducer;
  b. disabling the amplifier while leaving the feedback element in place; and
  c. analyzing the response of the transducer to the test signal with the signal processing circuit.

17. In a measurement system comprising a transducer, an amplifier having a feedback element coupled to the transducer and a signal processing circuit coupled to an output of the amplifier, a method of testing the transducer in-situ comprising:
  a. coupling a test signal to the transducer;
  b. disabling the amplifier while leaving the feedback element in place;
  c. analyzing the response of the transducer to the test signal with the signal processing circuit; and
  d. comparing a measured response of the transducer to a signature response wherein the signature response comprises a measured response of an unmounted transducer.

18. The method of claim 17 wherein the measured response of the transducer with built-in test whose output is programmed to assume a predetermined value when an unacceptable fault condition is detected.

19. The method of claim 17 wherein the measured response of the transducer with built-in test whose output is modulated with a signal reflecting the results of a detected fault condition.

20. The method of claim 17 wherein the measured response of the transducer with built-in test that provides an additional interface for communication of test results.

21. The method of claim 17 wherein the measured response of the transducer with built-in test that uses the results of the test to appropriately compensate its analog output signal.

* * * * *